(12) United States Patent
Miyamoto et al.

(10) Patent No.: US 12,365,008 B2
(45) Date of Patent: Jul. 22, 2025

(54) OPTICAL GRAIN DISCRIMINATING APPARATUS

(71) Applicant: SATAKE CORPORATION, Tokyo (JP)

(72) Inventors: Tomoyuki Miyamoto, Tokyo (JP); Takuya Nishida, Tokyo (JP); Hideaki Ishizu, Tokyo (JP); Masaaki Sadamaru, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 432 days.

(21) Appl. No.: 17/794,195

(22) PCT Filed: Jan. 22, 2021

(86) PCT No.: PCT/JP2021/002322
§ 371 (c)(1),
(2) Date: Jul. 20, 2022

(87) PCT Pub. No.: WO2021/149820
PCT Pub. Date: Jul. 29, 2021

(65) Prior Publication Data
US 2023/0059349 A1    Feb. 23, 2023

(30) Foreign Application Priority Data

Jan. 24, 2020  (JP) .................................. 2020-010374
Jan. 24, 2020  (JP) .................................. 2020-010380

(51) Int. Cl.
*G01N 21/359*   (2014.01)
*B07C 5/342*    (2006.01)
(Continued)

(52) U.S. Cl.
CPC ......... *B07C 5/342* (2013.01); *G01N 21/3563* (2013.01); *G01N 21/359* (2013.01); *G01N 2021/8466* (2013.01)

(58) Field of Classification Search
CPC ....... B07C 5/342; B07C 5/3425; B07C 5/366; G01N 21/3563; G01N 21/359;
(Continued)

(56) References Cited

U.S. PATENT DOCUMENTS 6,191,859 B1    2/2001  Winterbottom et al.
2015/0375270 A1*  12/2015  Ishizu .................. G01N 21/251
                                                     209/580

FOREIGN PATENT DOCUMENTS

CN    103464385 A    12/2013
CN    103575737 A    2/2014
(Continued)

OTHER PUBLICATIONS

Gamal M. ElMasry et al., "Image analysis operations applied to hyperspectral images for non-invasive sensing of food quality—A comprehensive review," Biosystems Engineering, vol. 42, 2016, pp. 53-82.
(Continued)

*Primary Examiner* — Stephen P Coleman
(74) *Attorney, Agent, or Firm* — Faegre Drinker Biddle & Reath LLP

(57) ABSTRACT

An inspection unit for performing an optical inspection on a grain to be transferred by transfer means includes a visible light source, a near-infrared light source, a visible light detection unit, and a near-infrared light detection unit. A determination unit plots wavelength components of red (R), green (G), and blue (B), and a near-infrared light component in a three-dimensional space, to create a three-dimensional optical correlation diagram, for a plurality of good product
(Continued)

samples and defective product samples, and sets a threshold value, in which: the wavelength components are detected by the visible light detection unit; and the near-infrared light component is detected by the near-infrared light detection unit.

8 Claims, 18 Drawing Sheets

(51) Int. Cl.
*G01N 21/3563* (2014.01)
*G01N 21/84* (2006.01)

(58) Field of Classification Search
CPC ........... G01N 2021/8466; G01N 21/31; G01N 2021/3155; G01N 2021/8592; G01N 21/85
USPC ....................................................... 382/110
See application file for complete search history.

(56) References Cited

FOREIGN PATENT DOCUMENTS

| | | |
|---|---|---|
| CN | 106269570 A | 1/2017 |
| JP | H08-15140 A | 1/1996 |
| JP | H11-337495 A | 12/1999 |
| JP | 2008-302314 A | 12/2008 |
| JP | 2012-108026 A | 6/2012 |
| JP | 2014-157119 A | 8/2014 |
| JP | 2019-148607 A | 9/2019 |
| KR | 10-2013-0070146 A | 6/2013 |

OTHER PUBLICATIONS

The First Office Action issued Mar. 31, 2025 in a counterpart Chinese patent application No. 2021800107083.

* cited by examiner

FIG. 7

$$\bar{X} = (\bar{X_1}, \bar{X_2}, \cdots, \bar{X_n})$$

$$\bar{X_i} = \frac{1}{S} \sigma_{k=1}^{S} X_{ik} \quad \cdots (1)$$

WHERE S: NUMBER OF SAMPLE $$C_{ij} = \frac{1}{S} \sigma_{k=1}^{S} (X_{ik} - \bar{X_i})(X_{jk} - \bar{X_j}) \quad \cdots (2)$$

$$D_m^2 = (\alpha - \bar{\alpha_m})^t A^{-1} (\alpha - \bar{\alpha_m}) \quad \cdots (3)$$

WHERE m: INDEX OF AGGREGATE
A: VARIANCE-COVARIANCE MATRIX
$\alpha_m$: CENTER OF GRAVITY VECTOR OF AGGREGATE m $$d^2 = \sigma_{i=1}^{n} (X_{pi} - X_{qi})^2 \quad \cdots (4)$$

$$m : a_1 x + b_1 y + c_1 z = d_1 \quad \cdots (5)$$

$$u : a_2 x + b_2 y + c_2 z = d_1 \quad \cdots (6)$$

$$P = A + te \quad \cdots (7)$$

WHERE A: POINT PASSING THROUGH LINE OF INTERSECTION L
e: VARIANCE-COVARIANCE MATRIX
t: PARAMETER $$e = [b_1 c_2 - c_1 b_2, c_1 a_2 - a_1 c_2, a_1 b_2 - b_1 a_2] \quad \cdots (8)$$

WHERE $X_e = b_1 c_2 - c_1 b_2$ $Y_e = c_1 a_2 - a_1 c_2$ $Z_e = a_1 b_2 - b_1 a_2$

WHEN $Z_e \neq 0$ $((d_1 b_2 - d_2 b_1) / Z_e, (d_1 a_2 - d_2 a_1) / (-Z_e), 0)$ WHEN $Y_e \neq 0$ $((d_1 c_2 - d_2 c_1) / (-Y_e), 0, (d_1 a_2 - d_2 a_1) / Y_e)$ WHEN $X_e \neq 0$ $(0, (d_1 c_2 - d_2 c_1) / X_e, (d_1 b_2 - d_2 b_1) / (-X_e))$ WHEN $X_e = 0, Y_e = 0, Z_e = 0$ THERE IS NO LINE OF INTERSECTION
(TWO PLANES ARE PARALLEL). $\cdots (9)$

| | GOOD PRODUCT | DEFECTIVE PRODUCT No. 1 No. 3 |
|---|---|---|
| CCD IMAGE | | |
| NIR IMAGE (850 nm) | | |
| NIR IMAGE (850 nm) AFTER OBJECT RECOGNITION | | |
| NIR IMAGE (1550 nm) AFTER OBJECT RECOGNITION | | |

FIG. 29

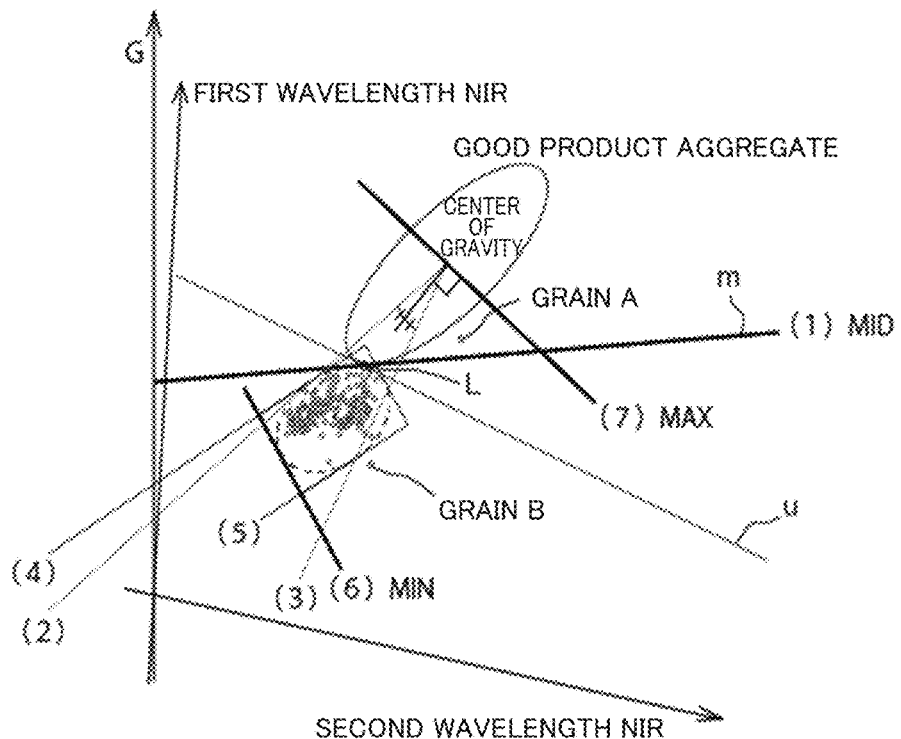

FIG. 30

| | MATERIAL (GRAIN TO BE DISCRIMINATED "RICE GRAIN") | | | | |
|---|---|---|---|---|---|
| | GOOD PRODUCT | | DEFECTIVE PRODUCT | | |
| | WHITE RICE GRAIN | SHIRATA | RICE GRAIN WITH COLORED PART | RICE GRAIN WITH LIGHTLY BAKED COLOR | FOREIGN SUBSTANCE |
| VISIBLE LIGHT IMAGE | ○ | ○ | ◉ | ○ | ○ |
| NEAR-INFRARED LIGHT IMAGE (850 nm) | ○ | ● | ◉ | ○ | ○ |
| NEAR-INFRARED LIGHT IMAGE (1550 nm) | ○ | ● | ◉ | ○ | ○ |

SHIRATA PART IS IMAGED BLACK.

COLORED PART IS IMAGED BLACK.

LIGHTLY BAKED COLOR IS IMAGED A LITTLE DARK.

OPTICAL GRAIN DISCRIMINATING APPARATUS

CROSS REFERENCE TO RELATED APPLICATIONS

This application is a National Stage of International Application No. PCT/JP2021/002322, filed Jan. 22, 2021, and claims the benefit of Japanese Patent Application No. 2020-010374, filed Jan. 24, 2020, and Japanese Patent Application No. 2020-010380, filed Jan. 24, 2020, the entire contents of each of which are incorporated herein by reference.

TECHNICAL FIELD

The present invention relates to an optical grain discriminating apparatus for discriminating between a good product and a defective product for a grain based on an optical inspection.

BACKGROUND ART

For grains such as cereal, it is necessary to sort and separate foreign substances, such as rice husks and stones, and defective products, from good products such as brown rice grains. Therefore, various devices have been proposed for discriminating between a good grain and a defective grain by optical inspection and eliminating the defective product. For example, Patent Literature 1 discloses an optical grain sorting machine that: irradiates grains transferred by transfer means with light; plots the wavelength components of R (red), G (green), and B (blue) light transmitted through or reflected from grains on a three-dimensional color space; discriminates between a good product or a defective product from the three-dimensional color distribution of the grain; and eliminates only the defective product.

CITATION LIST

Patent Literature

[Patent Literature 1] Japanese Patent Laid-Open No. 2014-157119

SUMMARY OF INVENTION

Technical Problem

When discrimination is made using the three wavelength components of light of red (R), green (G), and blue (B) with an optical grain sorting machine as described in Patent Literature 1, the color and shape of a good product and a defective product may be similar. In such a case, the quality cannot be discriminated between such grains. For example, black stones may be mixed in black beans or harmful substances such as black mycelium may be mixed in black sunflower seeds. In such a case, the set of good products and the set of defective products overlap as shown in FIG. 16, and the quality cannot be discriminated.

Therefore, the problem to be solved by the present invention is to provide an optical grain discriminating apparatus capable of discriminating a quality with high accuracy if a good product and a defective product of grains have similar colors and shapes.

Solution to Problem (1) There is provided an optical grain discriminating apparatus including:
an inspection unit for performing an optical inspection on a grain to be transferred by transfer means; and a determination unit for discriminating between a good product and a defective product for the grain, based on the optical inspection by the inspection unit,
wherein the inspection unit includes at least: a visible light source for irradiating the grain with visible light; a near-infrared light source for irradiating the grain with near-infrared light; a visible light detection unit for detecting visible light transmitted through the grain or visible light reflected from the grain; and a near-infrared light detection unit for detecting near-infrared light transmitted through the grain or near-infrared light reflected from the grain, and
the determination unit
plots wavelength components of red (R), green (G), and blue (B), and a near-infrared light component in a three-dimensional space, to create a three-dimensional optical correlation diagram, for a plurality of good product samples and a plurality of defective product samples, and thereby sets a threshold value, the wavelength components being detected by the visible light detection unit, the near-infrared light component being detected by the near-infrared light detection unit.

(2) There is provided the optical grain discriminating apparatus, wherein
the determination unit
plots two of wavelength components of red (R), green (G), and blue (B) light, and the near-infrared light component in a three-dimensional space, to create a three-dimensional optical correlation diagram, for a plurality of good product samples and a plurality of defective product samples, and thereby sets a threshold value, the wavelength components being detected by the visible light detection unit, the near-infrared light component being detected by the near-infrared light detection unit.

(3) There is provided the optical grain discriminating apparatus, wherein
the determination unit
plots one of wavelength components of red (R), green (G), and blue (B) light, and a plurality of near-infrared light components in a three-dimensional space, to create a three-dimensional optical correlation diagram, for a plurality of good product samples and a plurality of defective product samples, and thereby sets a threshold value, the wavelength components being detected by the visible light detection unit, the near-infrared light components being detected by the near-infrared light detection unit.

(4) There is provided the optical grain discriminating apparatus, wherein
the determination unit:
creates a Mahalanobis distance boundary surface and a Euclidean distance boundary surface for separating a good product aggregate and a defective product aggregate in a three-dimensional optical correlation diagram;
creates a two-dimensional plane perpendicular to a line of intersection between the Mahalanobis distance boundary surface and the Euclidean distance boundary surface; and applies an inertia equivalent ellipse to the defective product aggregate on the two-dimensional plane, and thereby creates a closed region and sets a threshold value in the closed region.

(5) There is provided the optical grain discriminating apparatus, wherein
the determination unit
plots a plurality of combinations of two wavelength components and the near-infrared light component in a three-dimensional space, to create a plurality of types of three-dimensional optical correlation diagrams, for a plurality of good product samples and a plurality of defective product samples, each of the combinations of two wavelength components including any two of wavelength components of the red (R), green (G), and blue (B) light, the wavelength components being detected by the visible light detection unit, the near-infrared light component being detected by the near-infrared light detection unit.

(6) There is provided the optical grain discriminating apparatus, wherein
the determination unit
plots one of wavelength components of red (R), green (G), and blue (B) light, and a plurality of combinations of two near-infrared light components in a three-dimensional space, to create a plurality of types of three-dimensional optical correlation diagrams, for a plurality of good product samples and a plurality of defective product samples, the wavelength components being detected by the visible light detection unit, each of the combinations of two near-infrared light components including any two of the near-infrared light components, the near-infrared light components being detected by the near-infrared light detection unit.

(7) There is provided the optical grain discriminating apparatus, wherein
a near-infrared light component detected by the near-infrared light detection unit is a near-infrared light component within a contour of the grain detected by the visible light detection unit.

(8) There is provided the optical grain discriminating apparatus according to any one of claims 1 to 7, wherein
the determination unit:
in setting the threshold value within the closed region, creates an circumscribed rectangle consisting of two straight lines parallel to a minor axis of an inertia equivalent ellipse and passing through individual end points of a major axis, and two straight lines parallel to the major axis and passing through individual end points of the minor axis; and creates two straight lines connecting a center of gravity of a good product aggregate and individual end points in a major axis direction of the circumscribed rectangle.

(9) There is provided the optical grain discriminating apparatus according to any one of claims 1 to 8, wherein
the determination unit:
in setting the threshold value within the closed region, uses a Mahalanobis distance boundary surface minimizing a Mahalanobis distance as a first plane; uses a plane connecting a center of gravity of a good product aggregate and one end in a major axis direction of a circumscribed rectangle as a second plane; uses a plane connecting the center of gravity of the good product aggregate and another end in a major axis direction of the circumscribed rectangle as a third plane; uses a long side of the circumscribed rectangle on one side as a fourth plane; uses a long side of the circumscribed rectangle on another side as a fifth plane; and uses a short side of the circumscribed rectangle on one side far from the good product aggregate as a sixth plane.

(10) There is provided the optical grain discriminating apparatus, further including a display and input means capable of input by an operator based on what is displayed on the display,
wherein the display can display a plurality of the three-dimensional optical correlation diagrams of: any two of wavelength components of red (R), green (G), and blue (B); and a near-infrared light component, and
the input means can select any one of the three-dimensional optical correlation diagrams displayed on the display, based on operation of an operator.

(11) There is provided the optical grain discriminating apparatus, further including a display and input means capable of input by an operator based on what is displayed on the display,
wherein the display can display a plurality of the three-dimensional optical correlation diagrams of: any one of wavelength components of red (R), green (G), and blue (B) light; and any two of near-infrared light components, and
the input means can select any one of the three-dimensional optical correlation diagrams displayed on the display, based on operation of an operator.

(12) There is provided the optical grain discriminating apparatus, wherein
the inspection unit includes a first inspection unit located on a front side of the grain to be transferred, and a second inspection unit located on a rear side of the grain to be transferred, and
the first inspection unit and the second inspection unit each include the visible light detection unit and the near-infrared light detection unit.

(13) There is provided the optical grain discriminating apparatus, wherein
the grain to be transferred by transfer means is a seed or a kernel.

(14) There is provided an optical grain discriminating apparatus including:
an inspection unit for performing an optical inspection on a grain to be transferred by transfer means; and a determination unit for discriminating between a good product and a defective product for the grain, based on the optical inspection by the inspection unit,
wherein the inspection unit includes at least: a visible light source for irradiating the grain with visible light; a near-infrared light source for irradiating the grain with near-infrared light; a visible light detection unit for detecting visible light transmitted through the grain or visible light reflected from the grain; and a near-infrared light detection unit for detecting near-infrared light transmitted through the grain or near-infrared light reflected from the grain,
the determination unit:
performs multivariate analysis using parameters consisting of: three wavelength components of red (R), green (G), and blue (B); and a plurality of near-infrared light components, for a plurality of good product samples and a plurality of defective product samples, the three wavelength components being detected by the visible light detection unit, the near-infrared light components being detected by the near-infrared light detection unit; and
plots wavelength components and near-infrared light components, to create a three-dimensional optical correlation diagram, based on results of the multivariate analysis, and thereby sets a threshold value, the wavelength components being detected by the visible light detection unit, the near-infrared light components being detected by the near-infrared light detection unit.

Advantageous Effects of Invention

The inventions according to the above (1) to (4) allow accurately discriminating the quality of grains that cannot conventionally be discriminated using the three wavelength components of red (R), green (G), and blue (B) detected by the visible light detection unit.

The invention according to the above (5) is configured such that: the determination unit creates a plurality of types of three-dimensional optical correlation diagrams (for example, the following three types: red (R), green (G), and NIR; red (R), blue (B), and NIR; and green (G), blue (B), and NIR), based on a plurality of combinations of two wavelength components each including any two of wavelength components of red (R), green (G), and blue (B) light (for example, the following three combinations: R and G, R and B, and G and B), and a near-infrared light component, in which the wavelength components are detected by the visible light detection unit, and the near-infrared light component is detected by the near-infrared light detection unit. This configuration allows comparing a plurality of three-dimensional optical correlation diagrams relative to each other, and selecting the wavelength components of visible light most suitable for discriminating the quality of grains.

The invention according to the above (6) is configured such that: the determination unit creates a plurality of types of three-dimensional optical correlation diagrams (for example, green (G), 850 nm NIR, and 1550 nm NIR; and red (R), 1200 nm NIR, and 1550 NIR), based on one of wavelength components of red (R), green (G), and blue (B) light detected by the visible light detection unit, and two different near-infrared light components detected by the near-infrared light detection unit. This configuration allows comparing a plurality of three-dimensional optical correlation diagrams relative to each other, and selecting the wavelength components of visible light most suitable for discriminating the quality of grains.

The invention according to the above (7) is configured such that: the near-infrared light component within the contour of the grain is detected according to the contour of the grain detected by the visible light detection unit, in order to accurately detect the near-infrared light component in the grain to be discriminated. This allows discriminating between a good grain and a defective grain with high accuracy.

The inventions according to the above (8) and (9) are configured such that: in setting threshold value within the closed region, the determination unit: uses the Mahalanobis distance boundary surface minimizing a Mahalanobis distance as a first plane; uses a plane connecting a center of gravity of a good product aggregate and one end in a major axis direction of the circumscribed rectangle as a second plane; uses a plane connecting the center of gravity of the good product aggregate and another end in a major axis direction of the circumscribed rectangle as a third plane; uses a long side of the circumscribed rectangle on one side as a fourth plane; uses a long side of the circumscribed rectangle on another side as a fifth plane; and uses a short side of the circumscribed rectangle on one side far from the good product aggregate as a sixth plane. This allows discriminating between a good grain and a defective grain with high accuracy.

The invention according to the above (10) allows selecting and displaying the three-dimensional optical correlation diagrams displayed on the display based on the operation of the operator. This allows the operator to select the wavelength components having the most significant difference (high correlation) in selecting two wavelength components from red (R), green (G), and blue (B) light. This allows discriminating between a good grain and a defective grain with high accuracy.

The invention according to the above (11) allows selecting and displaying the three-dimensional optical correlation diagrams displayed on the display based on the operation of the operator. This allows the operator to select the wavelength component having the most significant difference (high correlation) in selecting one wavelength component from red (R), green (G), and blue (B) light. This allows discriminating between a good grain and a defective grain with high accuracy.

The invention according to the above (12) is configured such that: the first inspection unit and the second inspection unit are provided in the front and rear of the grain to be transferred; and visible light images and near-infrared light images of the grain can be obtained in the respective inspection units. For example, when at least one inspection unit outputs a determination result in which a grain is a defective product, the grain can be discriminated as a defective product. This allows improving the accuracy of discriminating between a good grain and a defective grain.

The invention according to the above (13) allows discriminating between a good grain or a defective grain with high accuracy, for seeds other than the black sunflower seeds shown in the embodiment, or grains such as rice grain.

The invention according to the above (14) is configured such that: the determination unit performs multivariate analysis using parameters consisting of three wavelength components of red (R), green (G), and blue (B), and a plurality of near-infrared light components, for a plurality of good product samples of grains and a plurality of defective product samples of grains, in which the three wavelength components are detected by the visible light detection unit, and the near-infrared light components are detected by the near-infrared light detection unit. The determination unit plots the wavelength components, and the near-infrared light components, to create a three-dimensional optical correlation diagram, based on the results of the multivariate analysis, and thereby sets a threshold value, in which the wavelength components are detected by the visible light detection unit, and the near-infrared light components are detected by the near-infrared light detection unit. This allows deriving the correlation between the three wavelength components of red (R), green (G), and blue (B) detected by the visible light detection unit and the near-infrared light components such as 850 nm, 1200 nm, and 1550 nm. This then allows creating an optimum three-dimensional optical correlation diagram for discriminating between a good product and a defective product of the grain, and setting a threshold value.

BRIEF DESCRIPTION OF DRAWINGS

FIG. 7 is a diagram showing a calculation expressions related to threshold value calculation.

FIG. 29 is a diagram in associating calculations of threshold value created by 6 planes surrounding the inertia equivalent ellipse, and three sensitivity levels of minimum (MIN), medium (MID) and maximum (MAX) with each other, in the second embodiment of the present invention.

FIG. 30 is schematic visible light images and near-infrared light images of grains to be discriminated in a modification.

DESCRIPTION OF EMBODIMENTS

The following describes embodiments of the present invention in detail with reference to the drawings.

First Embodiment

The following describes a first embodiment of the present invention with reference to the drawings. An optical grain discriminating apparatus 1 in the present embodiment discriminates between the seeds of black sunflower seeds that are good products, and the defective products mixed in the seeds of black sunflower seeds, among the grains to be discriminated, based on a threshold value determined based on optical inspection. The good products conform to the standard. The defective products include harmful substances such as mycelium, stones, non-standard products.

Figure 1:
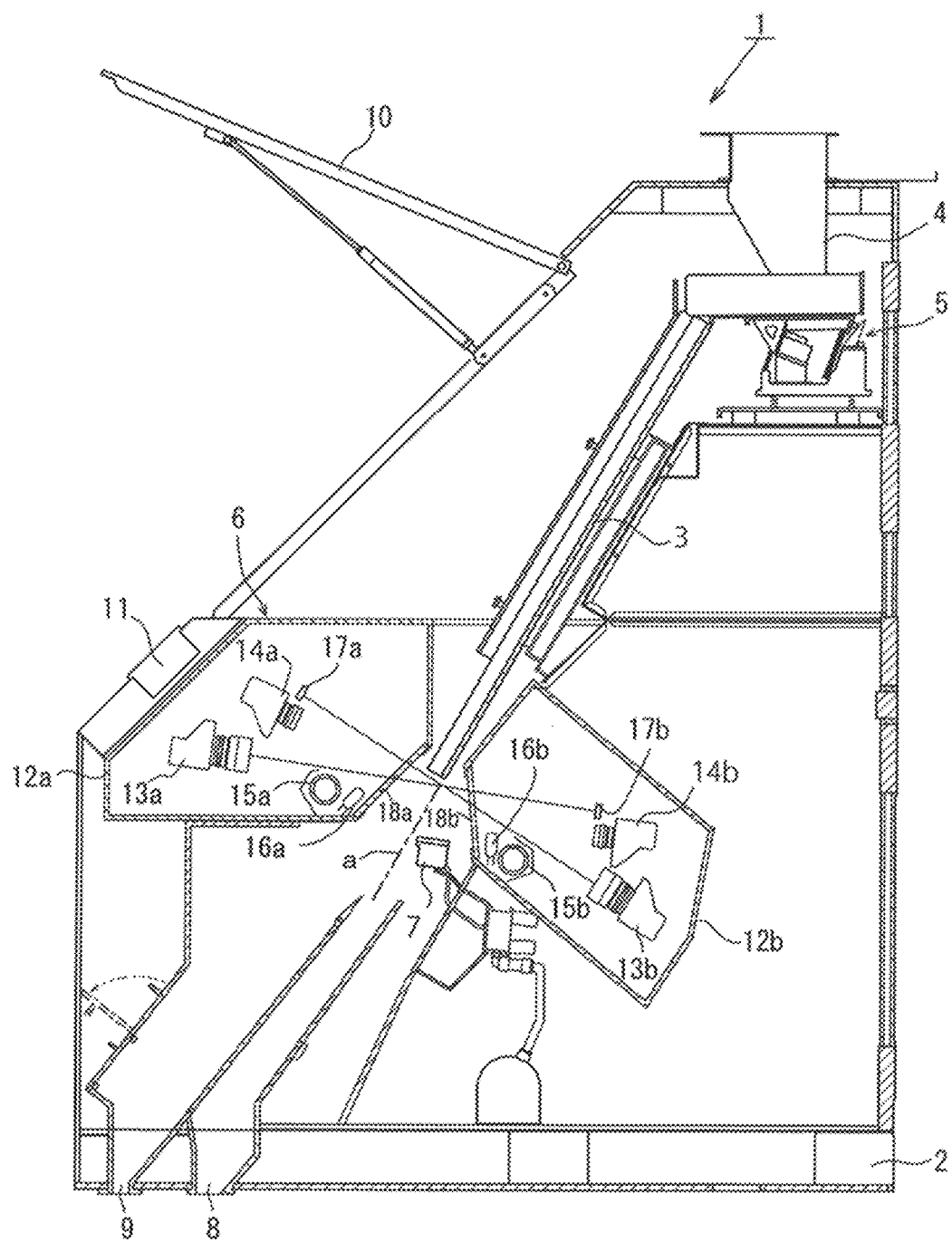
FIG. 1 is a cross-sectional view of an optical grain discriminating apparatus showing a first embodiment of the present invention.

FIG. 1 shows a cross-sectional view of the optical grain discriminating apparatus 1. As shown in the figure, the optical grain discriminating apparatus 1 of the present embodiment has a machine body 2. Inside the machine body 2, there is installed: an inclined chute 3 that is transfer means of grains; a storage tank 4 for storing grains; a vibrating feeder 5 for conveying grains from the storage tank 4 to the upper end of the chute 3; an inspection unit 6 for performing an optical inspection on the grains falling from the chute 3; an ejector nozzle 7 provided below the inspection unit 6; a good product collection unit 8 for receiving the good product that has fallen without receiving the ejected air of the ejector nozzle 7; and a defective product collection unit 9 for collecting defective products blown off by the ejected air of the ejector nozzle 7. The front side of the machine body 2 has at least a door 10 that can open and close for various maintenance, and a display 11 for serving as a touch panel (input means) and a monitor for operation.

The inspection unit 6 for an optical inspection on a grain is housed inside a front box 12a and a rear box 12b installed with the falling trajectory of the grain being located therebetween. Inside the front box 12a, there are housed: a CCD camera 13a that is a visible light detection unit; a NIR camera 14a that is a near-infrared light detection unit; a visible light source 15a; a near-infrared light source 16a; and a background 17a of the CCD camera 13b to be described below. Inside the rear box 12b, there are housed: a CCD camera 13b that is a visible light detection unit; a NIR camera 14b that is a near-infrared light detection unit; a visible light source 15b; a near-infrared light source 16b; and a background 17b of the CCD camera 13a. The NIR cameras 14a and 14b of the present embodiment can detect near-infrared light of 850 nm and photograph an image.

The front box 12a and the rear box 12b has translucent portions 18a and 18b made of transparent plate-shaped members, provided on the sides of facing the falling trajectory a of the grains. Then, through the translucent portions 18a and 18b, the background 17a in the front box 12a is arranged to face the CCD camera 13b in the rear box 12b, and the background 17b in the rear box 12b is arranged to face the CCD camera 13a in the front box 12a.

Figure 2:
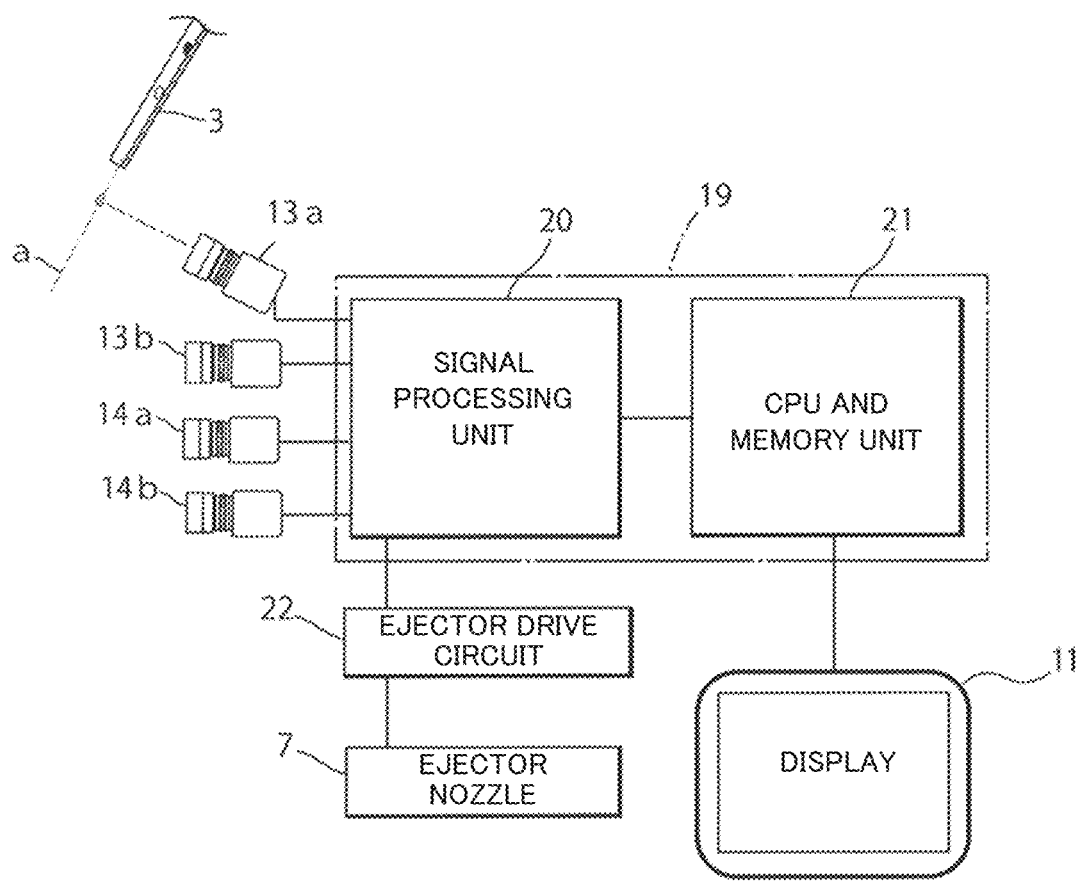
FIG. 2 is a block diagram of the optical grain discriminating apparatus according to the first embodiment of the present invention.

FIG. 2 shows a block diagram of the optical grain discriminating apparatus 1 of the present embodiment. As shown in the figure, the CCD cameras 13a and 13b detect the visible light components reflected from the grains or transmitted through the grains. Additionally, the NIR cameras 14a and 14b detect the near-infrared light components reflected from the grains or transmitted through the grains. Both the CCD cameras 13a and 13b and the NIR cameras 14a and 14b are connected to the determination unit 19. Both are further electrically connected to the signal processing unit 20 for processing the image data in the determination unit 19.

The signal processing unit 20 is connected to a CPU and memory unit 21 to be capable of bidirectional communication. The CPU and memory unit 21 can store the image processed by the signal processing unit 20 and perform arithmetic processing to be described below to calculate a threshold value for discriminating grains. The signal processing unit 20 is further connected to the ejector nozzle 7 via an ejector drive circuit 22. The CPU and memory unit 21 has the display 11, having input means such as a touch panel, connected thereto.

Figures 3, 4:
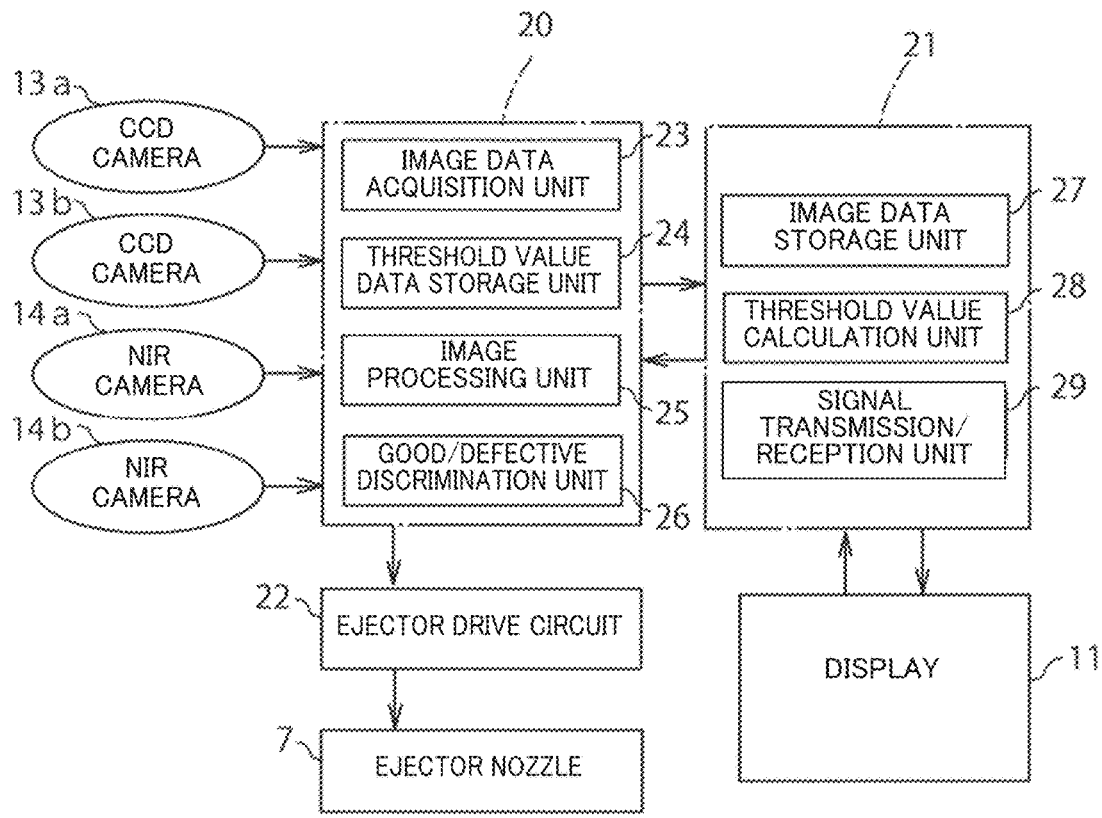
FIG. 3 is a block diagram of a determination unit according to the first embodiment of the present invention.
FIG. 4 shows images of good product samples and defective product samples of grains according to the first embodiment of the present invention. From the top, the images are: visible light images by CCD cameras; near-infrared light images by NIR cameras; and near-infrared light images obtained by respectively fitting the images by the NIR cameras into contours of the grains obtained by the CCD cameras.

FIG. 3 shows a block diagram of the determination unit 19 described above. As shown in the figure, the signal processing unit 20 includes: an image data acquisition unit 23 for temporarily storing image data captured by the CCD cameras 13a and 13b and the NIR cameras 14a and 14b; a threshold value data storage unit 24 for storing threshold value data calculated by the CPU and memory unit 21; an image processing unit 25 for binarizing the above image data; and a good/defective discrimination unit 26 for discriminating between a good product and a defective product for the imaged grain. Then, a signal from the good/defective discrimination unit 26 is transmitted to the ejector drive circuit 22, to open and close the valve of the ejector nozzle 7.

As shown in FIG. 3, the CPU and memory unit 21 includes: at least an image data storage unit 27 for storing image data from the image data acquisition unit 23; a threshold value calculation unit 28 for calculating a threshold value based on the image data stored in the image data storage unit 27; and a signal transmission/reception unit 29 for receiving an operation signal from the input means of the display 11 and outputting image data to the display 11.

Figure 5:
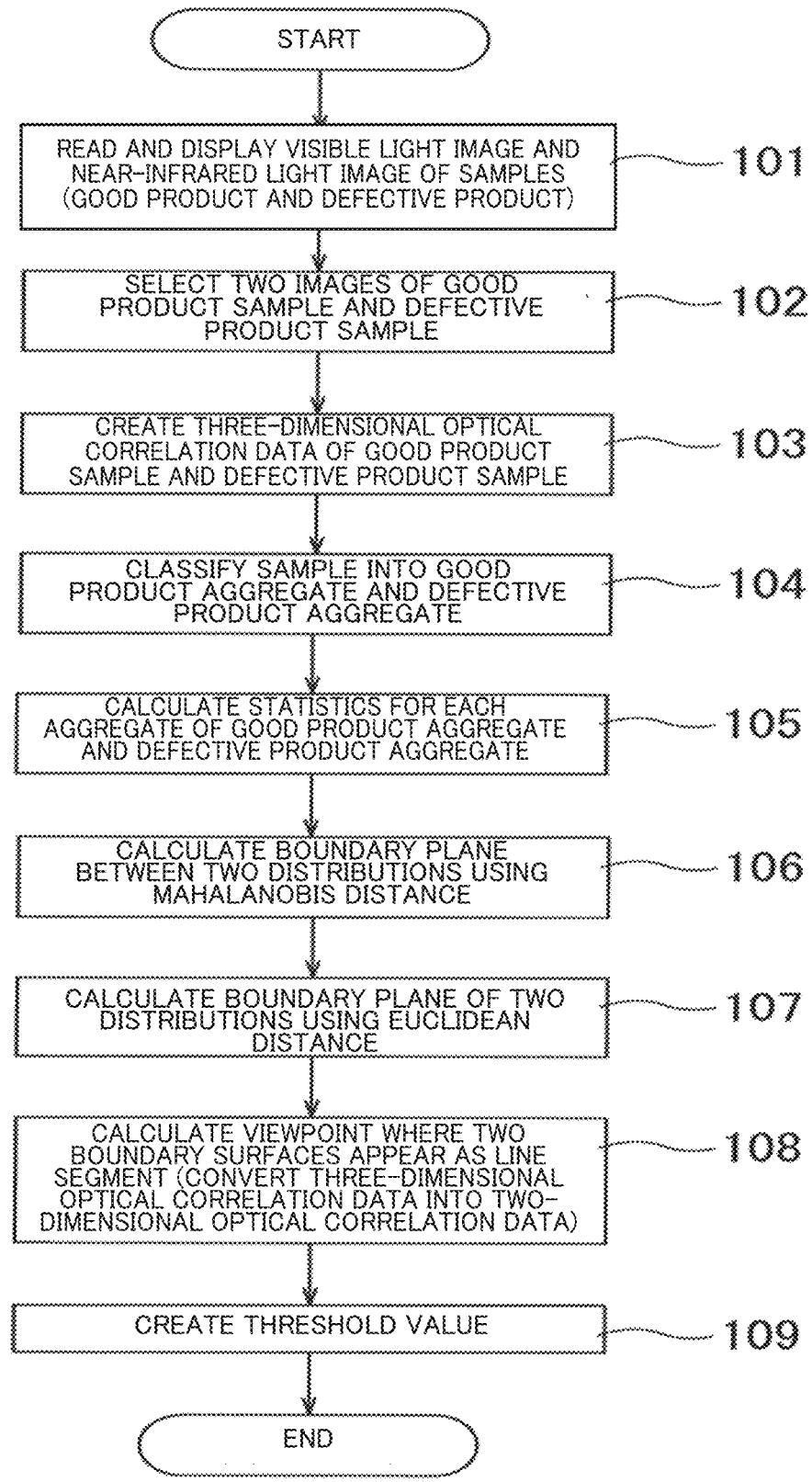
FIG. 5 is a flow chart showing a processing procedure of a signal processing unit.

The following describes a processing procedure for discriminating grains by the optical grain discriminating apparatus 1 in the first embodiment. FIG. 5 shows a flow chart showing a processing procedure of the signal processing unit 20. Steps 101 to 103 shown in FIG. 5 are a process of learning good product patterns and defective product patterns in which: an operator respectively moves good product samples and defective product samples (including foreign substances) of grains prepared in advance into the chute 3, to let the determination unit 19 learn the three-dimensional optical correlation data related to good products and defective products (including foreign substances).

Steps 104 to 108 shown in FIG. 5 are threshold value calculation process for automatically calculating a threshold value that is a boundary between a good product pattern and a defective product pattern. Step 109 is a threshold value determination process for automatically adjusting the threshold value calculated in the threshold value calculation process.

(Process of Learning Good Product Patterns and Defective Product Patterns)

In step 101, good product samples prepared in advance are moved to the chute 3, and the good product samples falling from the chute 3 are imaged by the CCD cameras 13a and 13b and the NIR cameras 14a and 14b. The image data of the good product samples are stored in the image data storage unit 27 via the image data acquisition unit 23, and are displayed on the display 11.

Next, in the same manner as in the case of the good product samples, the defective product samples are moved to the chute 3, and the defective product samples are imaged by the CCD cameras 13a and 13b and the NIR cameras 14a and 14b. The image data of the photographed defective product samples are stored in the image data storage unit 27 via the image data acquisition unit 23, and displayed on the display 11. Works up to here are not an actual sorting work, but a preparatory work for determining the threshold value to be described below. In the process of learning good product patterns and defective product patterns, the good product samples and the defective product samples are sorted in advance, and the ejector nozzle 7 is not operated.

Next, in step 102, the operator visually checks the image of each sample displayed on the display 11 again, and specifies what should be a good product and what should be a defective product (including a foreign substance) by an input operation. FIG. 4 shows images of good product samples and defective product samples of the grains. From the top, the images are: visible light images captured by the CCD cameras 13a and 13b; near-infrared light images captured by NIR cameras 14a and 14b (hereinafter, they may be referred to as "NIR images"); and near-infrared light images after object recognition in which the near-infrared light images by the NIR cameras 14a and 14b are respectively fitted into the contours of the grains obtained by the CCD cameras 13a and 13b. The visible light images by the CCD cameras 13a and 13b each have a clear contour of the grain, but the near-infrared light images by the NIR cameras 14a and 14b each have an unclear contour of the grain. Then, each of the near-infrared light images obtained by the NIR cameras 14a and 14b is fitted into the corresponding contour of the grain obtained by the CCD cameras 13a and 13b, so that the near-infrared light image after object recognition is displayed.

The near-infrared light images by the NIR cameras 14a and 14b are respectively fitted into the contours of the grains obtained by the CCD cameras 13a and 13b. If there is a misalignment between the visible light image of the grain obtained by the CCD cameras 13a and 13b and the near-infrared light image of the grain obtained by the NIR cameras 14a and 14b, the misaligned part may be misrecognized as a defective part, leading to poor discrimination. Therefore, it is preferable to perform object recognition from the contour of the grain obtained from the visible light image, and adjust the orientation and position of the CCD cameras 13a and 13b, and the NIR cameras 14a and 14b so that the misalignment is prevented in overlaying the near-infrared light image on the contour of the grain.

Figure 8:
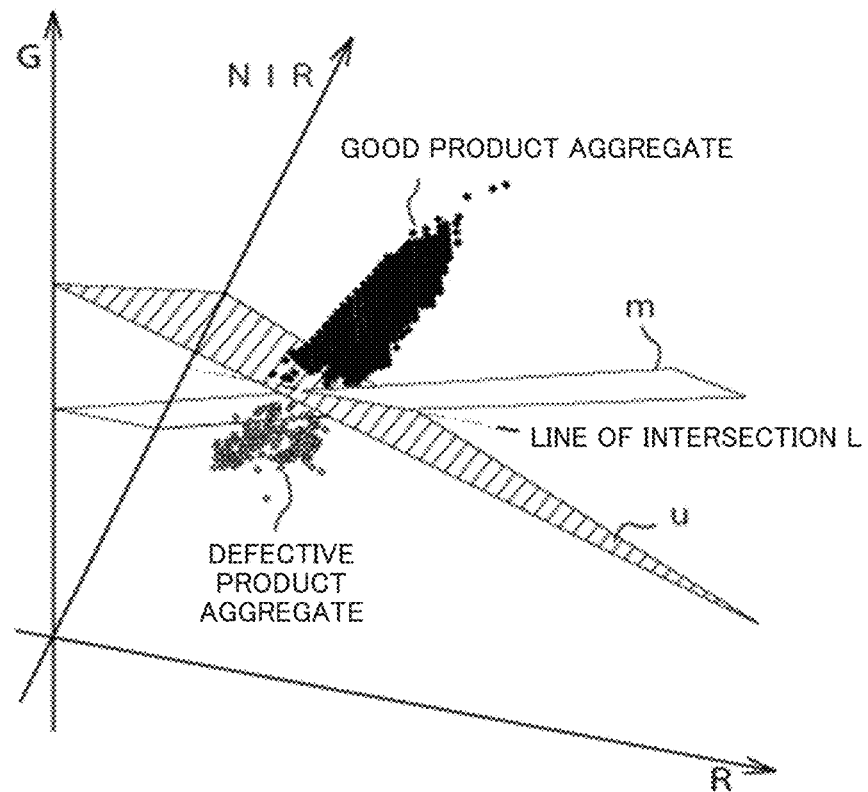
FIG. 8 is an R, G, and NIR three-dimensional optical correlation diagram in a three-dimensional space of good product samples and defective product samples according to the first embodiment of the present invention.
Figure 16:
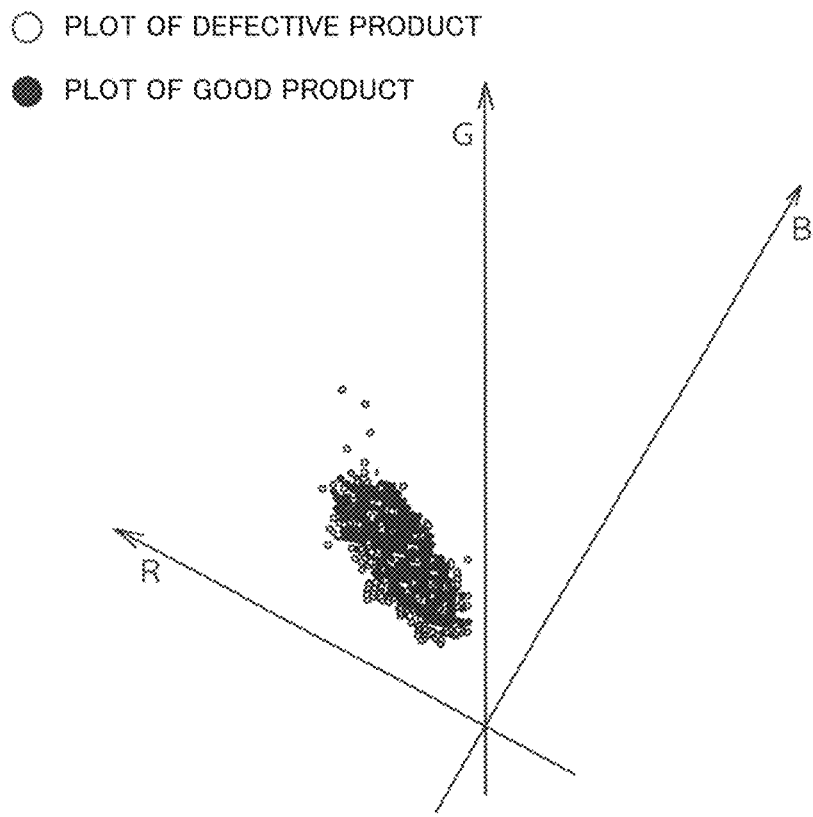
FIG. 16 is three-dimensional color distribution data related to a conventional optical grain sorting machine.

Next, the process proceeds to step 103 in which: two wavelength components of the wavelengths of red (R), green (G), and blue (B) light, and a near-infrared light component (that may be referred to as "NIR" hereinafter) are plotted in a three-dimensional space, for image data of a large number of good product samples and defective product samples; and thereby a three-dimensional optical correlation diagram is created as shown in FIG. 8. This allows effectively solving a conventional problem in which a defective product cannot be discriminated from a good product using the wavelength components of red (R), green (G), and blue (B) light, as shown in FIG. 16. In the present embodiment, as shown in FIG. 8, a good product samples and a defective product samples are plotted in a three-dimensional space consisting of axes of R, G, and NIR, and the wavelength of NIR is 850 nm. The operator selects specific wavelength components from the wavelength components of red (R), green (G), and blue (B) light. For the selection, the operator checks the plotting aspect in the three-dimensional space on the display 11 and selects the wavelength components having the most significant difference (highly correlated) by the input means. Of course, the determination unit 19 may automatically select the wavelength components without the operator selecting them.

(Threshold Value Calculation Process)

Step 104 roughly classifies the plotted components into the following: a good product aggregate formed by dots related to good products (black dots in FIG. 8); and a defective product aggregate formed by dots related to defective products (white circle dots in FIG. 8). Then, step 105 calculates statistics of multivariate data for each aggregate of the good product aggregate and the defective product aggregate.

The calculation of the statistics should be performed by the calculation of the center of gravity vector and the variance-covariance matrix. For example, the arithmetic expression of the center of gravity vector is represented by the expression (1) in FIG. 7. The arithmetic expression of the variance-covariance matrix is represented by the expression (2) of FIG. 7.

Next, the process determines a Mahalanobis square distance from each center of gravity vector of the good product aggregate and the defective product aggregate. Here, the Mahalanobis square distance is a function of the value of the multivariate data, and the arithmetic expression of the Mahalanobis square distance is expressed by the formula (3) in FIG. 7.

Next, step 106 determines the boundary surface between the aggregates. In determining this boundary surface, each of the values of multivariate data is classified into the aggregate with the minimum Mahalanobis square distance. This determines the aggregate to which every value of the multivariate data in the multivariate space belongs. Then, this determines the boundary surface indicated by the reference character m in FIG. 8.

Next, step 107 selects the Euclidean distance where the distance between the centers of gravity of the good product aggregate and the defective product aggregate is the longest, to search the boundary surface having a wide threshold value effective range. The Euclidean square distance is expressed by expression (4) in FIG. 7, where: the center of gravity vector of the good product aggregate is P (Xp1, Xp2, Xp3, . . . Xpn); and the center of gravity vector of the defective product aggregate is Q (Xq1, Xq2, Xq3, . . . Xqn).

Next, step 107 determines the boundary surface between the aggregates. In determining the boundary surface, the values of the multivariate data are classified into the aggregates having the maximum Euclidean square distance, to determine the boundary surface indicated by the reference character u in FIG. 8.

Figure 9:
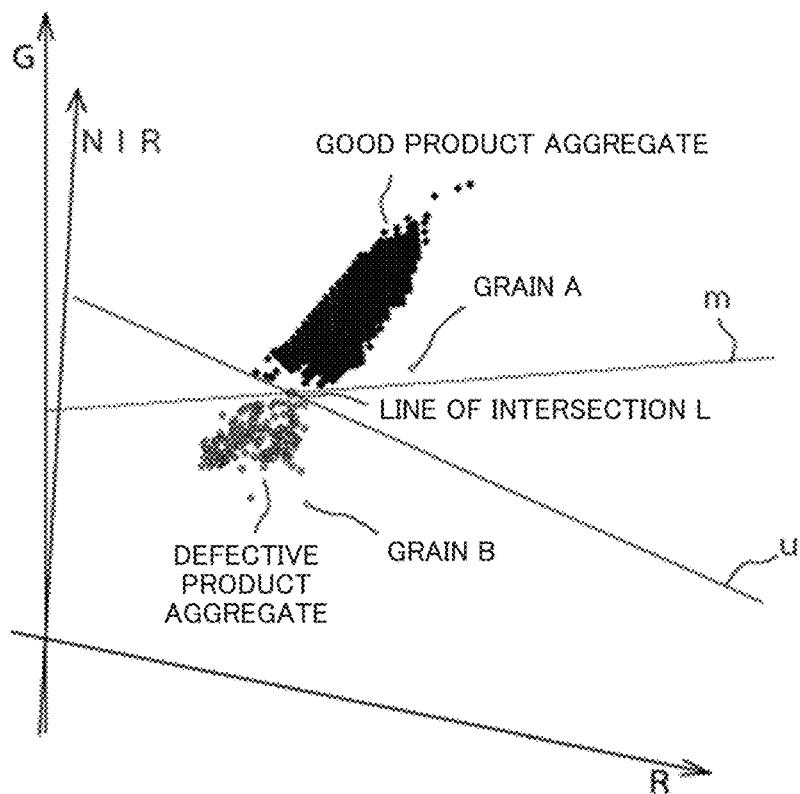
FIG. 9 is an R, G, and NIR correlation diagram on optimal two-dimensional plane of good product samples and defective product samples according to the first embodiment of the present invention.

Then, two characteristic planes m and u as shown in FIG. 8 are obtained, where: the equation of the plane m of the boundary surface that minimizes the Mahalanobis distance is expressed by equation (5) in FIG. 7; and the equation of the plane u of the boundary surface that maximizes the Euclidean distance is expressed by equation (6) in FIG. 7. Then, step 108 turns the three-dimensional optical correlation diagram of FIG. 8, to align the line-of-sight direction (line-of-sight vector) with a position in which these two different planes m and u intersect and can be seen as a line segment. This can determine the optimal threshold value obtained by reducing the dimension from the three-dimensional space shown in FIG. 8 to the two-dimensional plane as shown in FIG. 9. Therefore, the optical grain discriminating apparatus 1 can be provided which greatly simplifies the signal processing and enables the operator to easily handle.

An expression (7) of FIG. 7 can determine the line segment L (see FIG. 8 and the like) at which the plane m of the equation (5) of FIG. 7 and the plane u of the equation (6) of FIG. 7 intersect. Then, the direction vector e of the line of intersection, which is determined by the cross product calculation of the normal vectors of the two planes m and u, is an expression (8) in FIG. 7. The point P through which the line of intersection L passes is given by the expression (9) in FIG. 7. Determining the line of intersection L, as described above, allows converting the three-dimensional optical correlation diagram into an R, G, and NIR correlation diagram (see FIG. 9) in an optimal two-dimensional plane in which the viewpoint is placed on the line of intersection L.

(Threshold Value Calculation Process)

Next, step 109 automatically calculates the discrimination threshold value between the good product and the defective product based on the line of intersection L on the two-dimensional plane of FIG. 9. The following describes the details of the threshold value calculation process based on the flow chart of FIG. 6.

Figure 6:
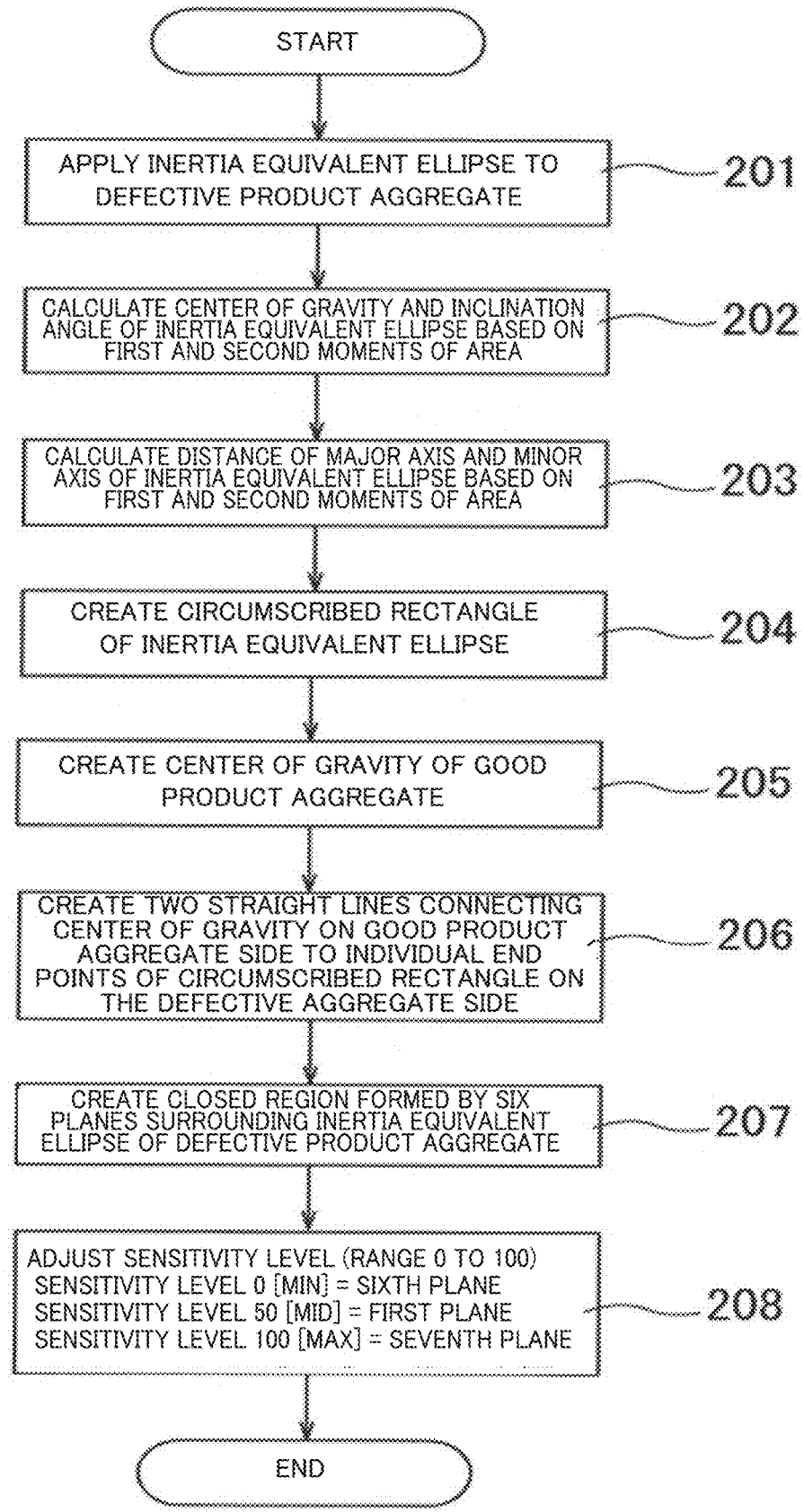
FIG. 6 is a flow chart showing a procedure for calculating a threshold value.

The flow chart of FIG. 6 is a flow chart showing in detail the threshold value calculation process of step 109 of FIG. 5. Step 201 applies an inertia equivalent ellipse to the defective product aggregate indicated by the white circle dots in FIG. 9 (see FIG. 10). An inertia equivalent ellipse is a feature amount that represents an ellipse having almost the same second moment of area around the center of gravity as the defective product aggregate, and allows understanding the feature of how the defective product aggregate spread. In practice, the defective product region is made sufficiently larger than the distribution of the defective product aggregate. Therefore, an inertia equivalent ellipse is created with the length of the major axis being a multiple of the standard deviation (a positive integer multiple) and the length of the minor axis being a multiple of the standard deviation (a positive integer multiple). These are empirical values and change depending on the type of grains, so it is preferable that they can be modified freely.

Figure 10:
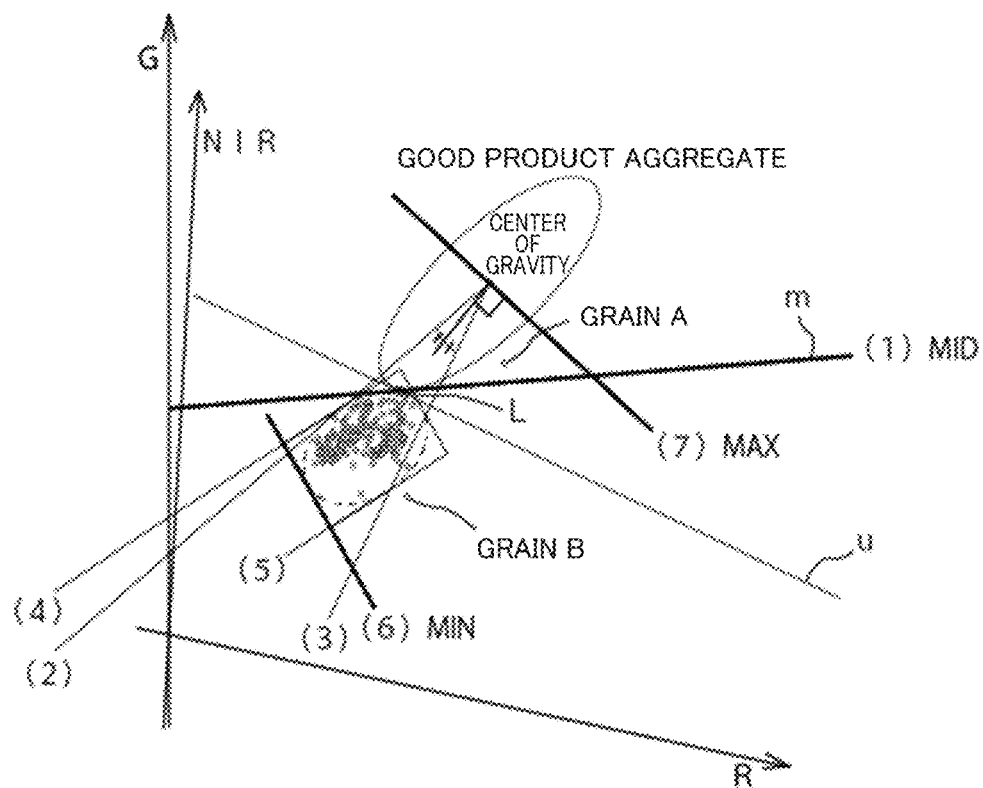
FIG. 10 is a diagram when an inertia equivalent ellipse is applied to a defective product aggregate on the optimal two-dimensional plane in the first embodiment of the present invention.

Then, step 202 determines the center of gravity G of the inertia equivalent ellipse and the inclination angle Θ in the major axis V direction, and step 203 subsequently calculates the distance of the major axis V and the distance of the minor axis W (see FIG. 10).

Figure 11:
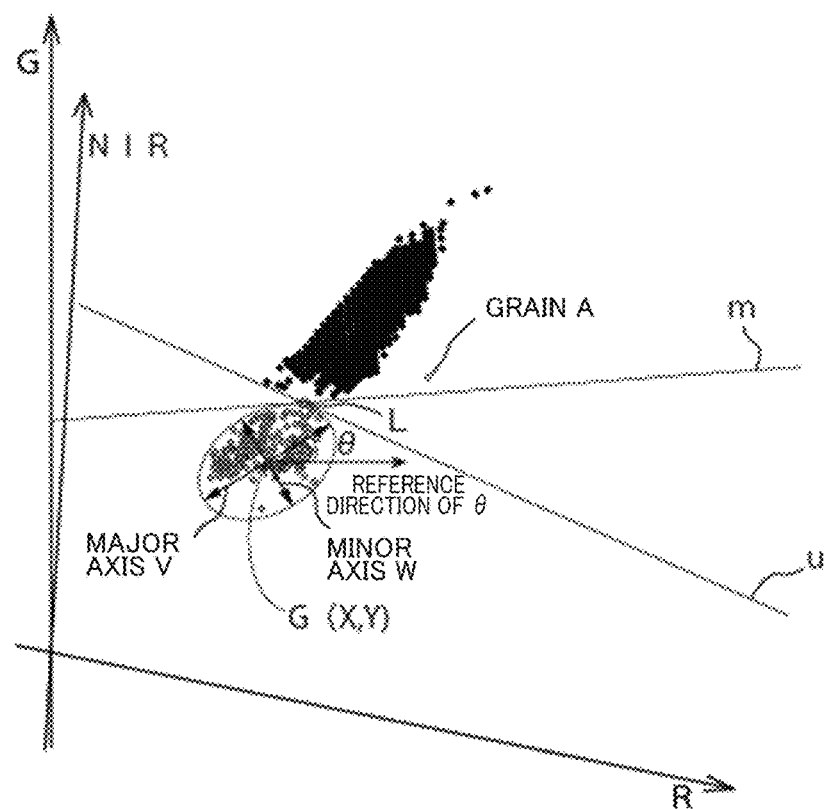
FIG. 11 is a diagram when a circumscribed rectangle is applied to the inertia equivalent ellipse in the first embodiment of the present invention.

In the inertia equivalent ellipse, step 204 draws two straight lines parallel to the minor axis and passing through the individual end points of the major axis, and two straight lines parallel to the major axis and passing through the individual end points of the minor axis. The four straight lines creates a circumscribed rectangle of the inertia equivalent ellipse (see FIG. 11). This circumscribed rectangle serves as a tentative reference in creating automatic sensitivity.

Next, step 205 calculates the center of gravity on the good product aggregate side. This is determined by calculation of a simple average of all good product data (see FIG. 11).

Figure 12:
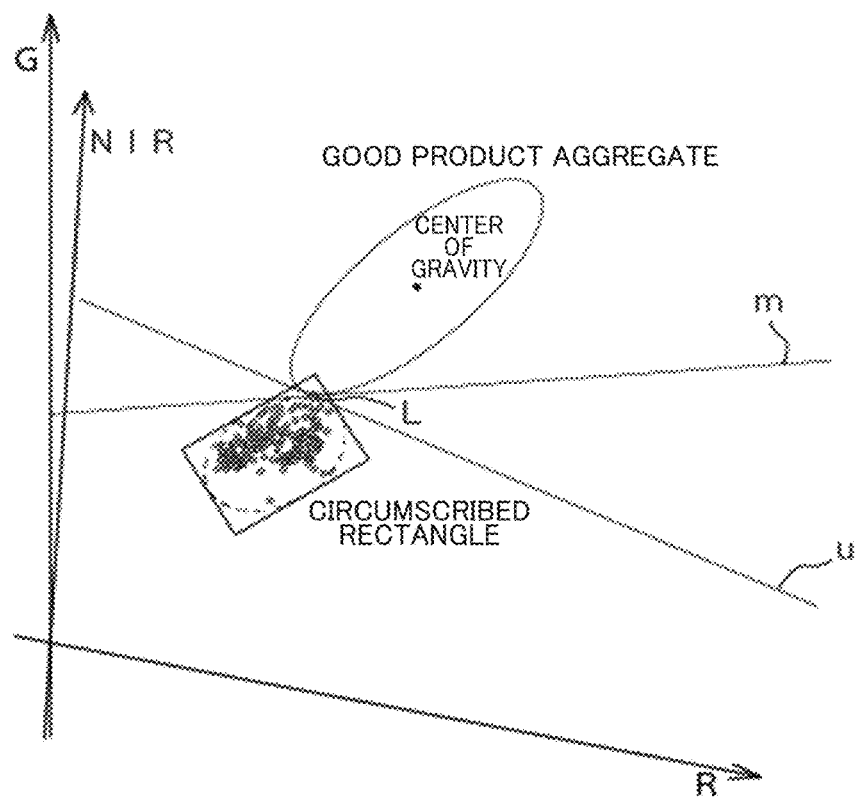
FIG. 12 is a diagram when two straight lines is created which connect: individual end points in a major axis direction of the circumscribed rectangle of the inertia equivalent ellipse; and the center of gravity of a good product aggregate, in the first embodiment of the present invention.

Then, the following processing is performed to determine the relationship between the good product aggregate and the defective product aggregate. Step 206 connects the center of gravity on the good product aggregate side determined in step 205 to individual end points in the major axis direction of the circumscribed rectangle, on the defective product aggregate side determined in step 204, and thereby creates two straight lines (FIG. 12, straight lines of reference numerals (2) and (3)).

Figure 13:
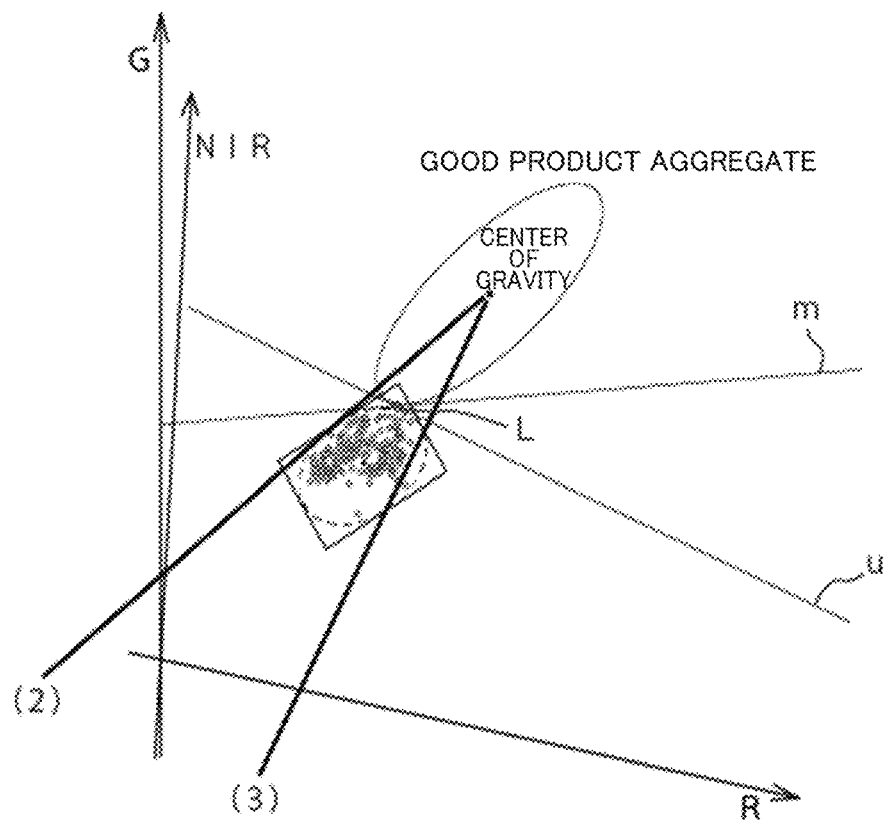
FIG. 13 is a diagram for creating six planes for forming a closed region surrounding the inertia equivalent ellipse in the first embodiment of the present invention.

The above steps create six planes forming a closed region surrounding the inertia equivalent ellipse applied to the defective product aggregate. As shown in FIG. 13, six planes surrounding the inertia equivalent ellipse includes: a first plane, which is the boundary surface (1) that minimizes the Mahalanobis distance; a second plane, which is a plane (2) connecting the center of gravity on the good product aggregate side to one end in the major axis direction of the circumscribed rectangle on the defective product aggregate side; a third plane, which is a plane (3) connecting the center of gravity on the good product aggregate side to the other end in the major axis direction of the circumscribed rectangle on the defective product aggregate side; a fourth plane, which is a long side (4) of the circumscribed rectangle on one side; a fifth plane, which is a long side (5) of the circumscribed rectangle on the other side; and a sixth plane, which is a short side (6) of the circumscribed rectangle on one side far from the good product aggregate.

The six planes (reference numerals (1) to (6) in FIG. 13) forming the closed region are determined by drawing such as creating a circumscribed rectangle. However, the way of determination is not limited to this. To replace the complicated arithmetic processing by the above drawing with a simple array reference processing and improve efficiency, the arithmetic processing can be replaced with a look-up table (LUT) in advance and stored in a memory or the like.

Figure 14:
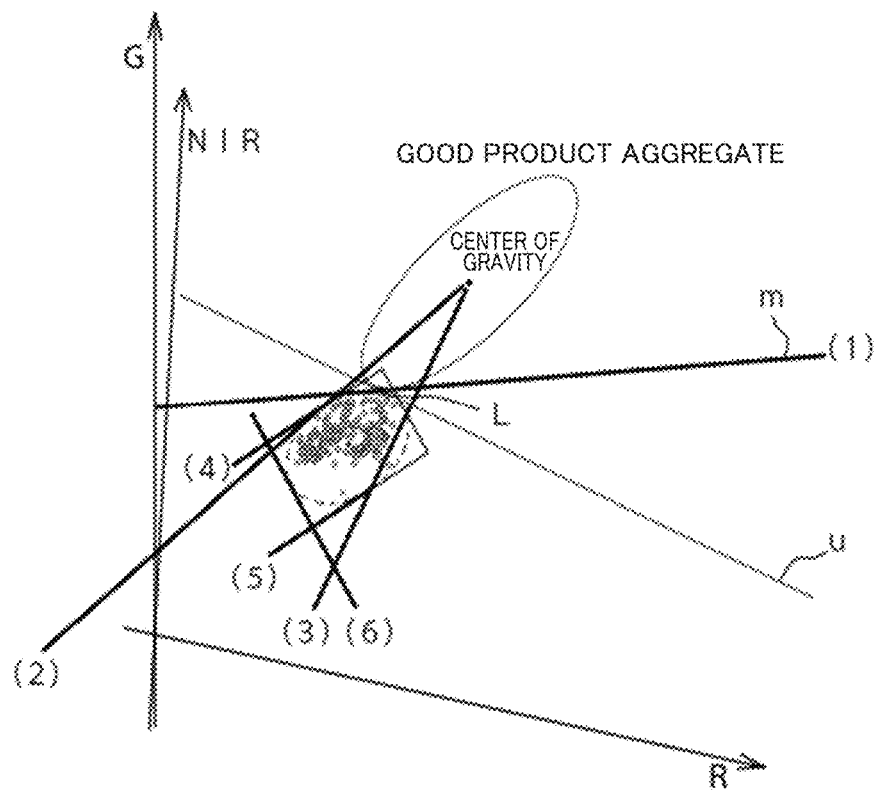
FIG. 14 is a diagram illustrating an exception in drawing the two-dimensional plane in the first embodiment of the present invention.

An exception to the drawing of the plane in the above paragraph 0044 is the case in which the following two angles are both larger than 45°: the angle γ formed by the straight line between the centers of gravity of the aggregates and the boundary surface (1) (see FIG. 14); and the angle ω formed by the major axis and the boundary surface (1) (see FIG. 14). In this case, the fourth plane and the fifth plane are on the side of the short sides, and the sixth plane is on the side of the long side.

Next, step 208 of FIG. 6 adjusts the sensitivity. The sensitivity level has its range represented by a numerical level of 0 to 100. When the sensitivity level is 0, the sensitivity is the minimum sensitivity (MIN) and does not enable discriminating between a good product and a defective product. The level can mix defective products with good products in sorting, and the sensitivity is low. When the sensitivity level is 50, the sensitivity is medium sensitivity (MID), and can accurately discriminate between a good product and a defective product. When the sensitivity level is 100, the sensitivity is maximum sensitivity (MAX), and can discriminate between a good product and a defective product with extremely high accuracy. However, the processing efficiency is poor because the good products are sorted out as well as defective products.

Figure 15:
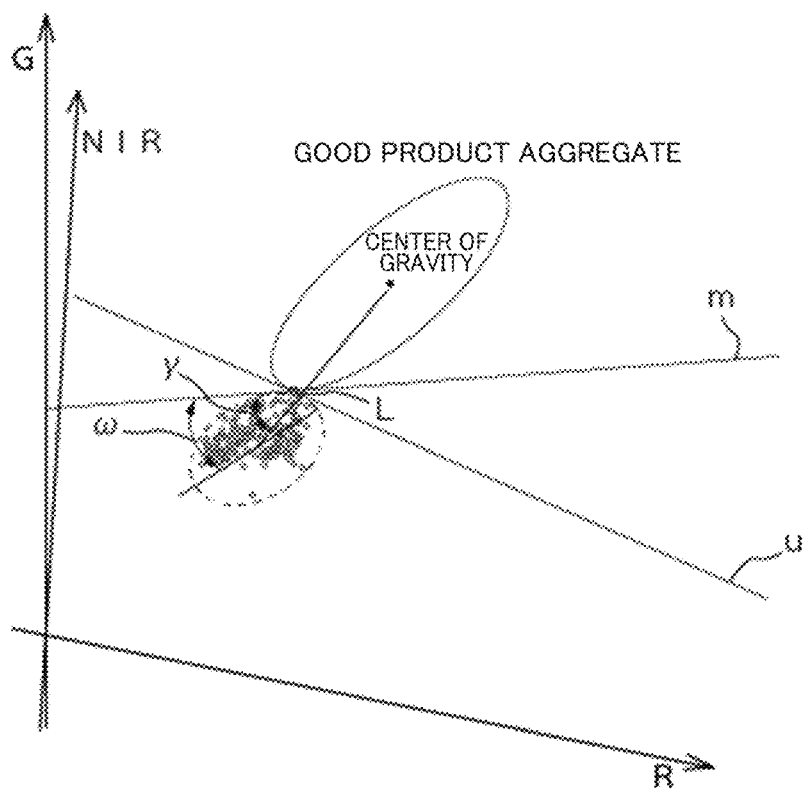
FIG. 15 is a diagram in associating calculations of threshold value created by six planes surrounding the inertia equivalent ellipse, with three sensitivity levels of minimum (MIN), medium (MID) and maximum (MAX), in the first embodiment of the present invention.

As shown in FIG. 15, the following describes correspondence between: the calculation of the threshold value created by the six planes surrounding the inertia equivalent ellipse described above; and the three sensitivity levels of the minimum sensitivity (MIN), the medium sensitivity (MID), and the maximum sensitivity (MAX).

The minimum sensitivity (MIN) is the same as the sixth plane (6); the medium sensitivity (MID) is the same as the first plane (1); the maximum sensitivity (MAX) is the same as the seventh plane (7), which is formed by a straight line perpendicular to a straight line that bisects the angle formed by the second plane (2) and the third plane (3). In other words, the sensitivity levels are respectively set to the sixth plane (6), the first plane (1), and the seventh plane (7) in FIG. 15. For example, if the sensitivity level is set to the medium sensitivity (MID), the region above the first plane (1) on FIG. 15 is the good product region, and the region below the first plane (1) on FIG. 15 is the defective product region. Then, the illustrated grain A is determined to be a good product, and the grain B is determined to be a defective product by the good/defective discrimination unit 26.

As described above, there is a correspondence between: three threshold values created by the first plane, the sixth plane, and the seventh plane; and three sensitivity levels consisting of the minimum sensitivity (MIN), the medium sensitivity (MID), and the maximum sensitivity (MAX). The correspondence is automatically created by touching the sensitivity creation button (not shown) arranged on the display 11. The threshold values are calculated after reducing the dimension from the three-dimensional space of FIG. 8 to the two-dimensional plane of FIG. 9, so that the signal processing can be greatly simplified.

The threshold value determined by the threshold value calculation unit 28 based on the flow as described above is stored in the threshold value data storage unit 24 of the signal processing unit 20. Subsequently, an actual discrimination work is performed, and the grains to be discriminated are moved from the storage tank 4 to the chute 3 while the ejector nozzle 7 can be driven. When the grains falling from the chute 3 reach the inspection unit 6, the CCD cameras 13*a* and 13*b* and the NIR cameras 14*a* and 14*b* image the grains.

The good/defective discrimination unit 26 reads a threshold value in the threshold value data storage unit 24, and discriminates between a good product and a defective product for a grain based on this threshold value, using the two wavelength components of red (R) and green (G) and near-infrared light in the image data captured by the CCD cameras 13*a* and 13*b* and the NIR cameras 14*a* and 14*b*. Of course, for a defective product, which clearly differs from a good product in color, a discrimination can be made between the good and the defective using only the two wavelength components of red (R) and green (G).

When the grain determined by the good/defective discrimination unit 26 to be a good product passes through the ejector nozzle 7, the ejector drive circuit 22 does not open the valve of the ejector nozzle 7. Consequently, the grain naturally falls toward the good product collection unit 8. When a grain determined by the good/defective discrimination unit 26 to be a defective product reaches the ejector nozzle 7, the ejector drive circuit 22 opens the valve of the ejector nozzle 7. Consequently, the ejected air from the ejector nozzle 7 blows the grain off the falling trajectory and the grain falls to the defective product collection unit 9.

In the first embodiment, the inspection unit 6 for optical inspection includes a front box 12*a* (first inspection unit) on the front side and a rear box 12*b* (second inspection unit) on the rear side with the falling trajectory a of the grain being therebetween. Each box houses a CCD camera, which is a visible light detection unit, and an NIR camera, which is a near-infrared light detection unit. Therefore, two visible light images and two near-infrared light images are acquired for one grain. This configuration enables a grain to be collected by the ejector nozzle 7 to the defective product collection unit 9, for example, if the grain is determined to be a defective product on either the front side or the rear side, enabling a highly accurate discrimination.

[Modification]

The above describes the first embodiment of the optical grain discriminating apparatus of the present invention. However, the present invention is not necessarily limited to the above-described embodiments, and includes, for example, the following modifications.

Figure 17:
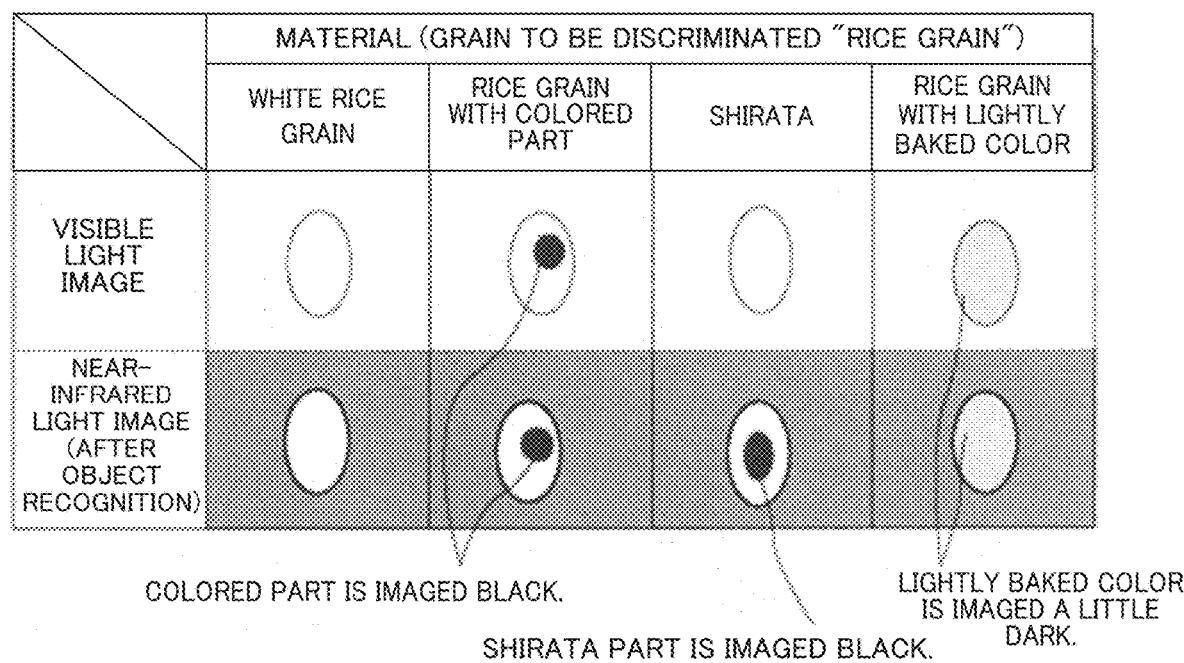
FIG. 17 is schematic visible light images and near-infrared light images of grains to be discriminated in a modification.

For example, in the above-mentioned first embodiment, the grains to be discriminated are black sunflower seeds, but other grains may be used. For example, rice grains can be discrimination targets. Specifically, the optical grain discriminating apparatus 1 of the present invention can discriminate between a good product and a defective product, out of grains to be discriminated, with respect to the threshold value determined based on the optical inspection as shown in FIG. 17. The good product is a white rice grain, and the defective product includes a rice grain with a colored part, rice grain with a lightly baked color, and a shirata to be described below. The optical grain discriminating apparatus 1 creates a three-dimensional optical correlation diagram based on the captured near-infrared light images and the visible light images, and determines the threshold value in the same manner as in the above-described embodiment. Thereby it can accurately discriminate between a good product and a defective product. On the other hand, a setting can leave "shirata", which is partially or wholly white, as a good product, for the purpose of improving processing efficiency.

The discrimination target is not limited to the above-mentioned black sunflower seeds and rice grains, and includes grains such as wheat, beans, or nuts, resin pieces such as pellets and beads, fine articles such as drugs, ores, or whitebait, and other grains. The optical grain discriminating apparatus of the present invention can be effectively applied when sorting raw materials including these grains into good products and defective products, or when eliminating foreign substances mixed in raw materials.

In the above-mentioned first embodiment, the discrimination target is a black sunflower seed. In the embodiment, the reflected components of visible light of red (R) and green (G), and near-infrared light having a wavelength of 850 nm are detected to create a three-dimensional optical correlation diagram. However, it is possible to select the wavelengths of visible light and near-infrared light in which the most significant difference appears, depending on the type of discrimination target. When selecting wavelengths of visible light and near-infrared light, the operator may visually check the three-dimensional optical correlation diagram displayed on the display 11 to select them, or the determination unit 19 may automatically select the wavelength.

In the first embodiment, the visible light detection unit used is a CCD camera capable of detecting three wavelength components of red (R), green (G), and blue (B). However, it is also possible to use a visible light detection unit that can detect only a specific wavelength.

In the first embodiment, the object recognition is performed using the contour of the grain obtained from the visible light image. To prevent misalignment in overlaying a near-infrared light image on the contour of a grain, the orientations and positions of the CCD cameras 13*a* and 13*b*, and the NIR cameras 14*a* and 14*b* are adjusted. However, the present invention is not necessarily limited to such a method. For example, when a deviation is observed in the near-infrared light image displayed on the display 11 after object recognition, it is possible to manually or automatically correct the position of the image to correct the deviation.

The first embodiment uses the CCD cameras, which are visible light detection units, and the NIR cameras, which are near-infrared light detection unit, respectively provided in the front box 12*a* and the rear box 12*b*, to acquire two visible light images and two near-infrared light images for one grain, and perform a highly accurate discrimination. However, the present invention is not necessarily limited to such a configuration. For example, there may be provided a CCD camera, serving as a visible light detection unit, and a NIR camera, serving as a near-infrared light detection unit, in only one of the front box 12*a* and the rear box 12*b*. In yet another modification, the CCD camera and the NIR camera in either one of the front box 12*a* and the rear box 12*b* can be provided to serve as a spare in case of failure.

Second Embodiment

The next describes a second embodiment of the present invention with reference to the drawings. The following describes the points different from the first embodiment described above, and may omit description on the common configurations.

Figure 18:
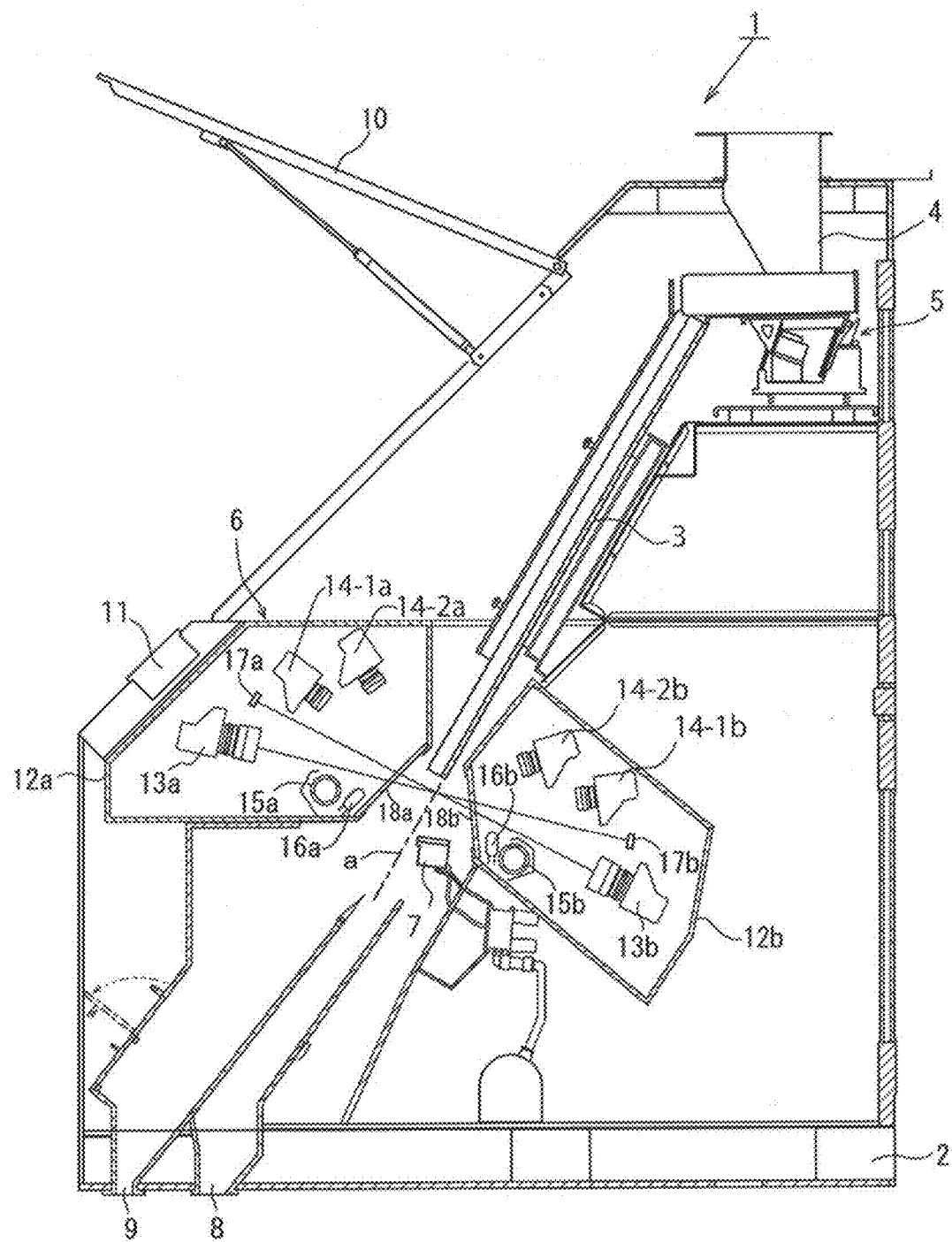
FIG. 18 is a cross-sectional view of an optical grain discriminating apparatus showing a second embodiment of the present invention.

FIG. 18 shows a schematic cross-sectional view of the optical grain discriminating apparatus 1 in the second embodiment. The inspection unit 6 for an optical inspection on a grain is housed inside the front box 12*a* and the rear box 12*b* installed with the falling trajectory a of the grain being located therebetween. The front box 12*a* houses: a CCD camera 13*a*, which is a visible light detection unit; a first wavelength NIR camera 14-1a and a second wavelength NIR camera 14-2a, which are near-infrared light detection units; a visible light source 15a; a near-infrared light source 16a; and a background 17a of a CCD camera 13b to be described below. The rear box 12b houses: a CCD camera 13b, which is a visible light detection unit; a first wavelength NIR camera 14-1b and a second wavelength NIR camera 14-2b, which are near-infrared light detection units; a visible light source 15b; a near-infrared light source 16b; and a background 17b of a CCD camera 13a to be described below. The first wavelength NIR cameras 14-1a and 14-1b of the present embodiment can detect near-infrared light of 850 nm and photograph an image. The second wavelength NIR cameras 14-2a and 14-2b can detect near-infrared light of 1550 nm and photograph an image.

Figure 19:
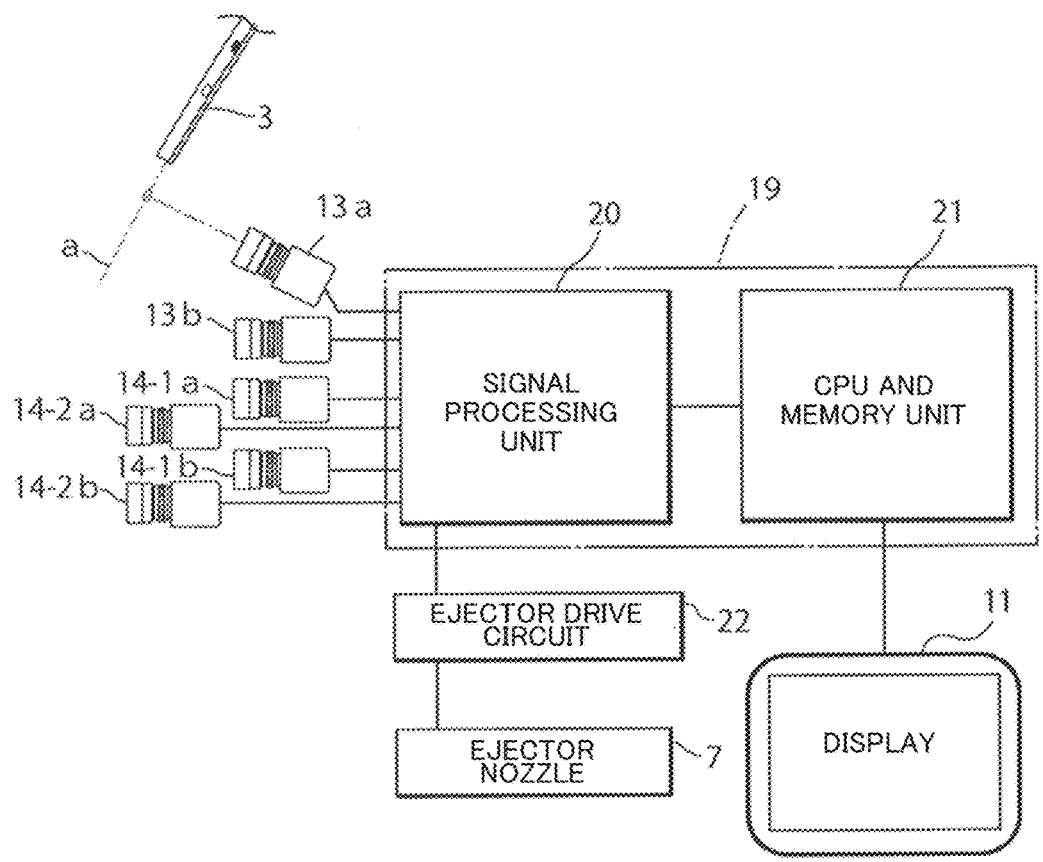
FIG. 19 is a block diagram of the optical grain discriminating apparatus according to the second embodiment of the present invention.

FIG. 19 shows a block diagram of the optical grain discriminating apparatus 1 in the second embodiment. The CCD cameras 13a and 13b detects the visible light component reflected from the grains or transmitted through the grains. The first wavelength NIR cameras 14-1a, 14-1b and the second wavelength NIR cameras 14-2a, 14-2b detect near-infrared light components reflected from the grains or transmitted through the grains. As illustrated, both the CCD cameras and the NIR cameras are connected to the determination unit 19. Both are further electrically connected to the signal processing unit 20 for processing the image data in the determination unit 19.

Figure 20:
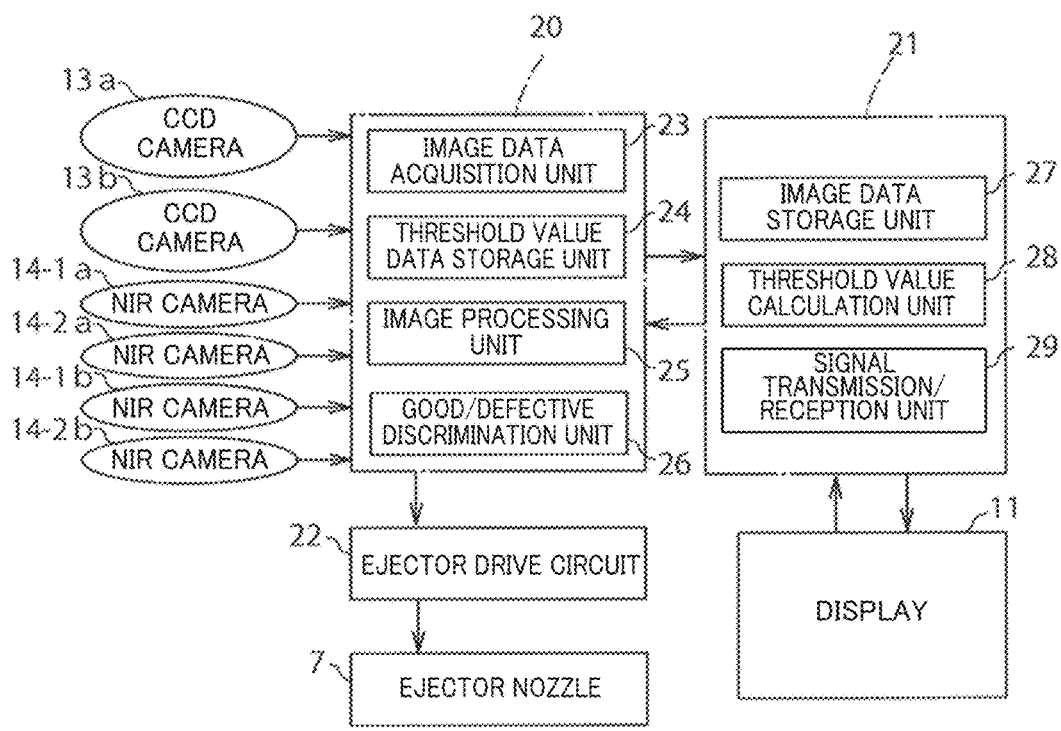
FIG. 20 is a block diagram of a determination unit according to the second embodiment of the present invention.

FIG. 20 shows a block diagram of the determination unit 19 described above. As shown in the figure, the signal processing unit 20 includes: an image data acquisition unit 23 for temporarily storing image data captured by the CCD cameras 13a and 13b, and the first wavelength NIR cameras 14-1a, 14-1b and the second wavelength NIR cameras 14-2a, 14-2b; a threshold value data storage unit 24 for storing threshold value data calculated by the CPU and memory unit 21; an image processing unit 25 for binarizing the above image data; and a good/defective discrimination unit 26 for discriminating between a good product and a defective product for the imaged grain. Then, a signal from the good/defective discrimination unit 26 is transmitted to the ejector drive circuit 22, to open and close the valve of the ejector nozzle 7.

The following describes a processing procedure for discriminating grains by the optical grain discriminating apparatus 1 in the second embodiment. FIG. 5 shows a flow chart showing a processing procedure of the signal processing unit 20. Steps 101 to 103 described in FIG. 5 are a process of learning good product patterns and defective product patterns in which: an operator respectively moves good product samples and defective product samples (including foreign substances) of grains prepared in advance into the chute 3, to let the determination unit 19 learn the three-dimensional optical correlation data related to good products and defective products (including foreign substances).

Steps 104 to 108 described in FIG. 5 are threshold value calculation process for automatically calculating a threshold value that is a boundary between a good product pattern and a defective product pattern. Step 109 is a threshold value determination process for automatically adjusting the threshold value calculated in the threshold value calculation process.

(Process of Learning Good Product Patterns and Defective Product Patterns)

In step 101, good product samples prepared in advance are moved to the chute 3, and the good product samples falling from the chute 3 are imaged by the CCD cameras 13a and 13b, and the first wavelength NIR cameras 14-1a, 14-1b and the second wavelength NIR cameras 14-2a, 14-2b. The image data of the good product samples are stored in the image data storage unit 27 via the image data acquisition unit 23, and are displayed on the display 11.

Next, in the same manner as in the case of the good product samples, the defective product samples are moved to the chute 3, and the defective product samples are imaged by the CCD cameras 13a and 13b, and the first wavelength NIR cameras 14-1a, 14-1b and the second wavelength NIR cameras 14-2a, 14-2b. The image data of the photographed defective product samples are stored in the image data storage unit 27 via the image data acquisition unit 23, and displayed on the display 11. Works up to here are not an actual sorting work, but a preparatory work for determining the threshold value to be described below. In the process of learning good product patterns and defective product patterns, the good product samples and the defective product samples are sorted in advance, and the ejector nozzle 7 is not operated.

Figures 21, 22:
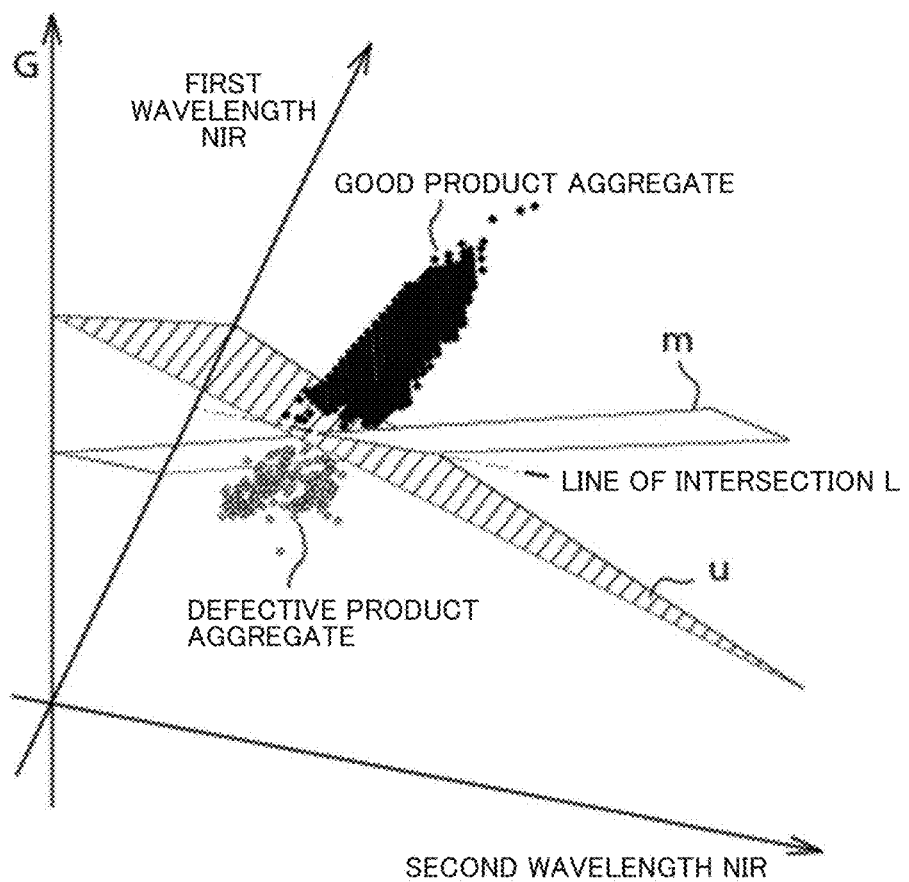
FIG. 21 shows images of good product samples and defective product samples of grains according to the second embodiment of the present invention. From the top, the images are: visible light images captured by CCD cameras 13a and 13b; near-infrared light images captured by first wavelength NIR cameras 14-1a and 14-1b; near-infrared light images after object recognition in which the near-infrared light images by the first wavelength NIR cameras 14-1a and 14-1b are respectively fitted into contours of the grains obtained by the CCD cameras 13a and 13b; near-infrared light images after object recognition in which near-infrared light images by second wavelength NIR cameras 14-2a and 14-2b are respectively fitted into the contours of the grains obtained by the CCD cameras 13a and 13b.
FIG. 22 is a three-dimensional optical correlation diagram, consisting of G, a first wavelength NIR, and a second wavelength NIR, in a three-dimensional space of good product samples and defective product samples, according to a second embodiment of the present invention.

Next, in step 102, the operator visually checks the image of each sample displayed on the display 11 again, and specifies what should be a good product and what should be a defective product (including a foreign substance) by an input operation. FIG. 21 shows images of good product samples and defective product samples of the grains. From the top, the images are: visible light images captured by the CCD cameras 13a and 13b; near-infrared light images captured by the first wavelength NIR cameras 14-1a and 14-1b; near-infrared light images after object recognition in which the near-infrared light images by the first wavelength NIR cameras 14-1a and 14-1 b are respectively fitted into the contours of the grain obtained by the CCD cameras 13a and 13b; near-infrared light images after object recognition in which the near-infrared light image by the second wavelength NIR cameras 14-2a and 14-2b are respectively fitted into the contours of the grain obtained by the CCD cameras 13a and 13b. The visible light images by the CCD cameras 13a and 13b each have a clear contour of the grain, but the near-infrared light images by the respective NIR cameras each have an unclear contour of the grain. Then, each of the respective near-infrared light images by the respective NIR cameras is fitted into the corresponding contour of the grain obtained by the CCD cameras 13a and 13b, so that the near-infrared light image after object recognition is displayed.

When each of the near-infrared light images captured by the NIR cameras is fitted into the corresponding contour of the grain obtained by the CCD cameras 13a and 13b, there may be a misalignment between the visible light image of the grain obtained by the CCD cameras 13a and 13b, and the near-infrared light image of the grain obtained by the NIR cameras. If there is a misalignment, the misaligned part may be misrecognized as a defective part, leading to poor discrimination. Therefore, it is preferable to perform object recognition from the contour of the grain obtained from the visible light image, and adjust the orientation and position of the CCD cameras 13a and 13b, and the respective NIR cameras, so that the misalignment is prevented in overlaying the near-infrared light image on the contour of the grain.

In the present embodiment, as shown in FIG. 21, the first wavelength NIR cameras 14-1a and 14-1b capture near-infrared light images having a wavelength component of 850 nm, and the second wavelength NIR cameras 14-2a and 14-2b capture near-infrared light images having a wavelength component of 1550 nm. As in the defective products No. 1 and No. 3 in FIG. 21, it may be difficult to discriminate the quality, based on the CCD image and the near-infrared light image of 850 nm. However, the near-infrared light image of 1550 nm differs between the good product and the defective product. Based on this, it is possible to accurately determine the quality of the object to be discriminated.

Next, the process proceeds to step 103 in which: one wavelength component of the wavelengths of red (R), green (G), and blue (B) light, and the two near-infrared light components (that may be referred to as "NIR" hereinafter) are plotted in a three-dimensional space, for image data of a large number of good product samples and defective product samples; and thereby a three-dimensional optical correlation diagram is created as shown in FIG. 22. This allows effectively solving a conventional problem in which a defective product cannot be discriminated from a good product using the wavelength components of red (R), green (G), and blue (B) light, as shown in FIG. 16. In the present embodiment, as shown in FIG. 22, good product samples and defective product samples are plotted in a three-dimensional space consisting of axes of G, a first wavelength NIR, and a second wavelength NIR. Here, the wavelength component of the first wavelength NIR is 850 nm, and the wavelength component of the second wavelength NIR is 1550 nm. The operator checks the plotting aspect of the wavelength components of the red (R), green (G), and blue (B) light in the three-dimensional space as on the display 11. Then, the operator selects the wavelength components having the most significant difference (highly correlated) among them by the input means. Of course, the determination unit 19 may automatically select the wavelength components without the operator selecting them.

(Threshold Value Calculation Process)

Step 104 roughly classifies the plotted components into the following: a good product aggregate formed by dots related to good products (black dots in FIG. 22) and a defective product aggregate formed by dots related to defective products (white circle dots in FIG. 22). Step 105 calculates statistics of multivariate data for each aggregate of the good product aggregate and the defective product aggregate.

The calculation of the statistics should be performed by the calculation of the center of gravity vector and the variance-covariance matrix. For example, the arithmetic expression of the center of gravity vector is represented by the expression (1) in FIG. 7. Further, the arithmetic expression of the variance-covariance matrix is represented by the expression (2) of FIG. 7.

Next, the process determines a Mahalanobis square distance from each center of gravity vector of the good product aggregate and the defective product aggregate. The Mahalanobis square distance is a function of the value of the multivariate data, and the arithmetic expression of the Mahalanobis square distance is expressed by the formula (3) in FIG. 7.

Next, step 106 determines the boundary surface between the aggregates. In determining this boundary surface, each of the values of the multivariate data is classified into an aggregate with the minimum Mahalanobis square distance. This determines the aggregate to which every value of the multivariate data in the multivariate space belongs. Then, this determines the boundary surface indicated by the reference character m in FIG. 22.

Next, step 107 selects the Euclidean distance where the distance between the centers of gravity of the good product aggregate and the defective product aggregate is the longest, to search the boundary surface having a wide threshold value effective range. The Euclidean square distance is expressed by expression (4) in FIG. 7, where: the center of gravity vector of the good product aggregate is P (Xp1, Xp2, Xp3, . . . Xpn); and the center of gravity vector of the defective product aggregate is Q (Xq1, Xq2, Xq3, . . . Xqn).

Next, step 107 determines the boundary surface between the aggregates. In determining the boundary surface, the values of the multivariate data are classified into the aggregates with the maximum Euclidean square distance, to determine the boundary surface indicated by the reference character u in FIG. 22.

Figure 23:
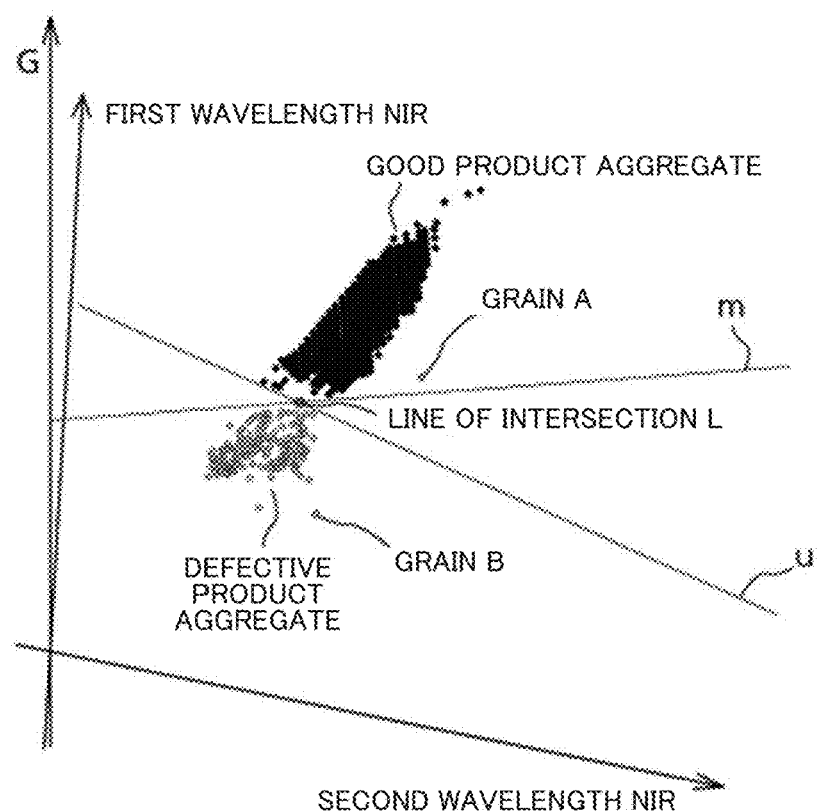
FIG. 23 is a correlation diagram, consisting of G, the first wavelength NIR, and the second wavelength NIR, on an optimal two-dimensional plane of good product samples and defective product samples, according to the second embodiment of the present invention.

Then, two characteristic planes m and u as shown in FIG. 22 are obtained, where: the equation of the plane m of the boundary surface that minimizes the Mahalanobis distance is expressed by equation (5) in FIG. 7; and the equation of the plane u of the boundary surface that maximizes the Euclidean distance is expressed by equation (6) in FIG. 7. Then, step 108 turns the three-dimensional optical correlation diagram of FIG. 22, to align the line-of-sight direction (line-of-sight vector) with a position in which these two different planes m and u intersect and can be seen as a line segment. This can determine the optimal threshold value obtained by reducing the dimension from the three-dimensional space shown in FIG. 22 to the two-dimensional plane as shown in FIG. 23. Therefore, the optical grain discriminating apparatus 1 can be provided which greatly simplifies the signal processing and enables the operator to easily handle.

An expression (7) of FIG. 7 can determine the line segment L (see FIG. 22 and the like) at which the plane m of the equation (5) of FIG. 7 and the plane u of the equation (6) of FIG. 7 intersect. Then, the direction vector e of the line of intersection, which is determined by the cross product calculation of the normal vectors of the two planes m and u, is an expression (8) in FIG. 7. The point P through which the line of intersection L passes is given by the expression (9) in FIG. 7. Determining the line of intersection L, as described above, allows converting the three-dimensional optical correlation diagram into the correlation diagram, consisting of G, the first wavelength NIR, and the second wavelength NIR (see FIG. 23) in an optimal two-dimensional plane in which the viewpoint is placed on the line of intersection L.

(Threshold Value Calculation Process)

Next, step 109 automatically calculates the discrimination threshold value between the good product and the defective product based on the line of intersection L on the two-dimensional plane of FIG. 23. Then, the following describes the details of the threshold value calculation process based on the flow chart of FIG. 6.

Figure 24:
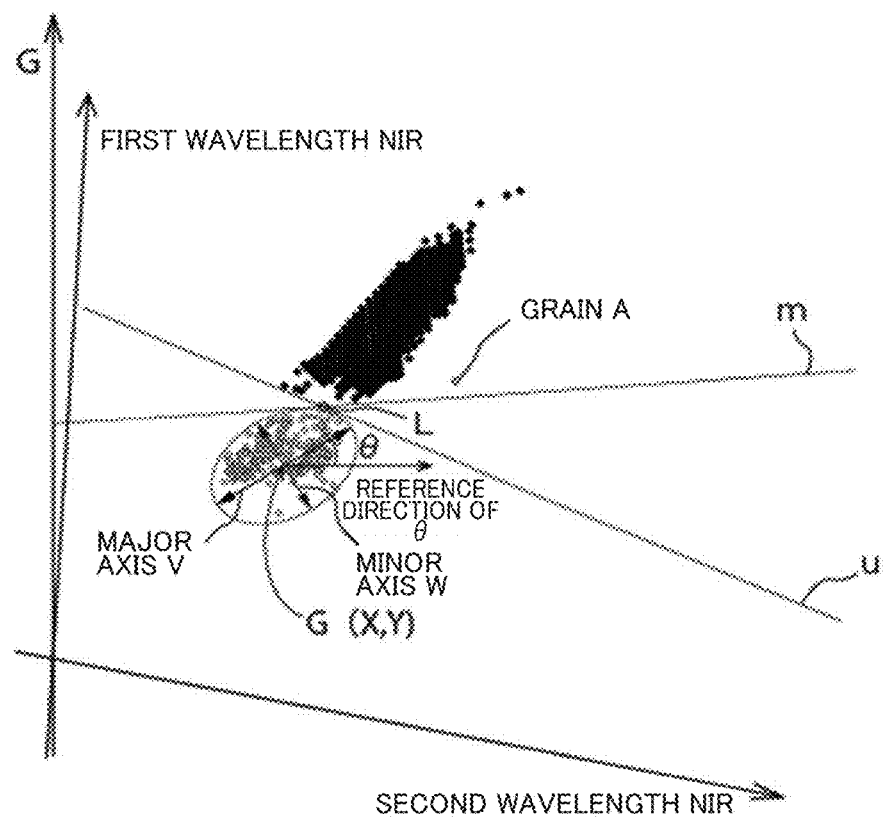
FIG. 24 is a diagram when an inertia equivalent ellipse is applied to a defective product aggregate on an optimal two-dimensional plane in the second embodiment of the present invention.

The flow chart of FIG. 6 is a flow chart showing in detail the threshold value calculation process of step 109 of FIG. 5. First, step 201 applies an inertia equivalent ellipse to the defective product aggregate indicated by the white circle dots in FIG. 23 (see FIG. 24). An inertia equivalent ellipse is a feature amount that represents an ellipse having almost the same second moment of area around the center of gravity as the defective product aggregate, and allows understanding the feature of how the defective product aggregate spread. In practice, the defective product region is made sufficiently larger than the distribution of the defective product aggregate. Therefore, an inertia equivalent ellipse is created with the length of the major axis being a multiple of the standard deviation (a positive integer multiple) and the length of the minor axis being a multiple of the standard deviation (a positive integer multiple). These are empirical values and change depending on the type of grains, so it is preferable that they can be modified freely.

Then, step 202 determines the center of gravity G of the inertia equivalent ellipse and the inclination angle Θ in the major axis V direction. Subsequently, step 203 calculates the distance of the major axis V and the distance of the minor axis W (see FIG. 24).

Figure 25:
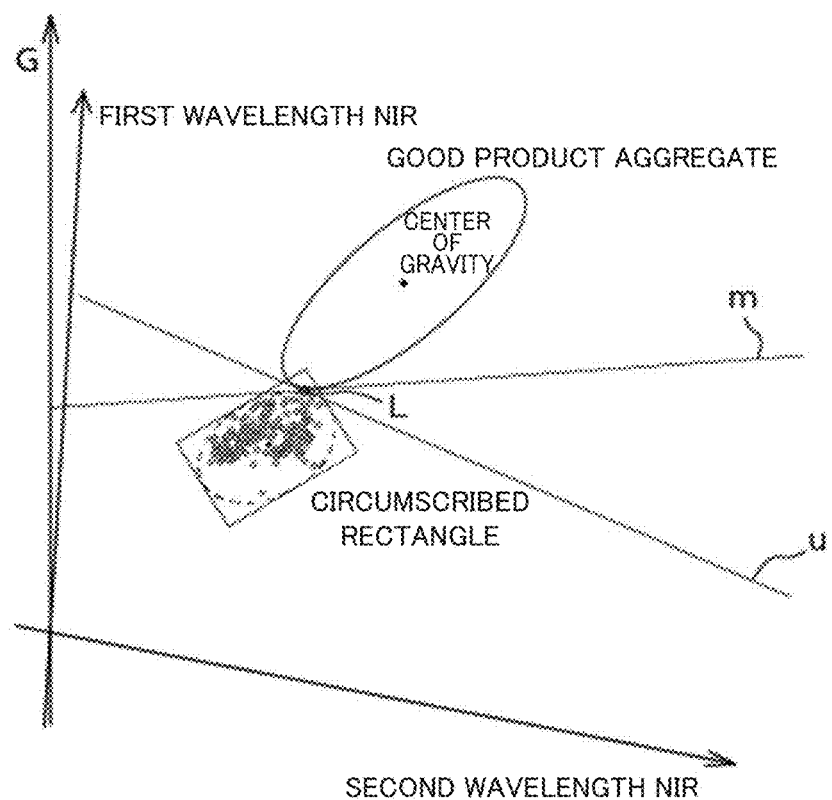
FIG. 25 is a diagram when a circumscribed rectangle is applied to the inertia equivalent ellipse in the second embodiment of the present invention.

In the inertia equivalent ellipse, step 204 draws two straight lines parallel to the minor axis and passing through the individual end points of the major axis, and two straight lines parallel to the major axis and passing through the individual end points of the minor axis. The four straight lines creates a circumscribed rectangle of the inertia equivalent ellipse (see FIG. 25). This circumscribed rectangle serves as a tentative reference in creating automatic sensitivity.

Next, step 205 calculates the center of gravity on the good product aggregate side. This is determined by calculation of a simple average of all good product data (see FIG. 25).

Figure 26:
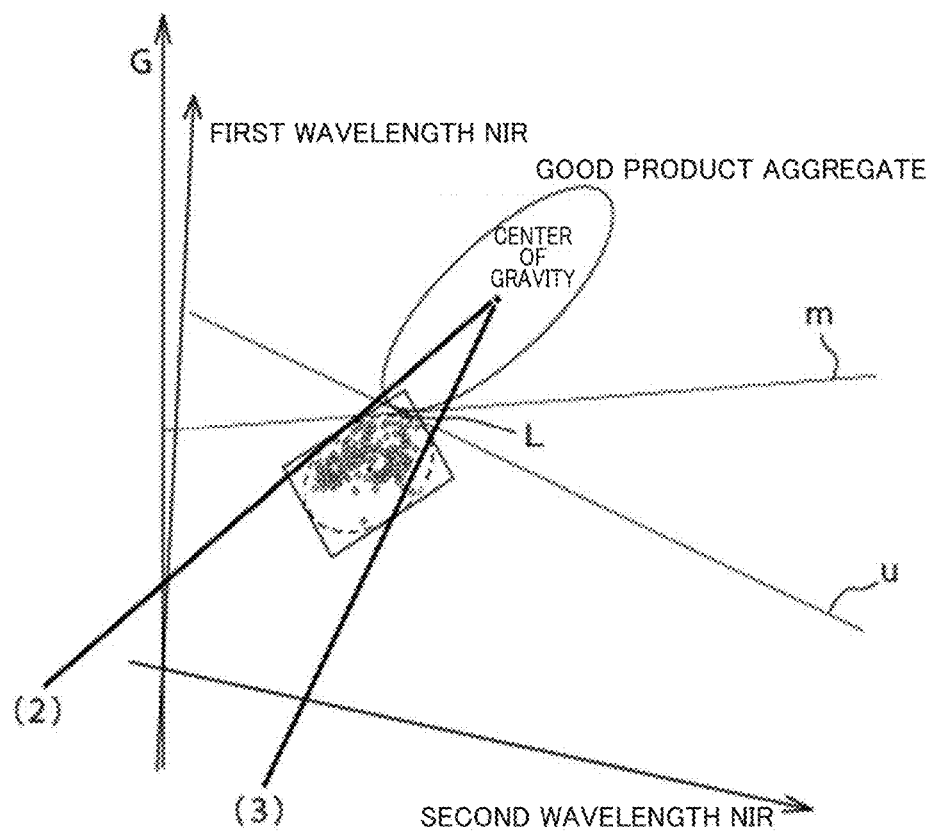
FIG. 26 is a diagram when two straight lines is created which connect: individual end points in a major axis direction of the circumscribed rectangle of the inertia equivalent ellipse; and the center of gravity of a good product aggregate, in the second embodiment of the present invention.

Then, the following processing is performed to determine the relationship between the good product aggregate and the defective product aggregate. Step 206 connects the center of gravity on the good product aggregate side determined in step 205 to individual end points in the major axis direction of the circumscribed rectangle, on the defective product aggregate side determined in step 204, and thereby creates two straight lines (FIG. 26, straight lines of reference numerals (2) and (3)).

Figure 27:
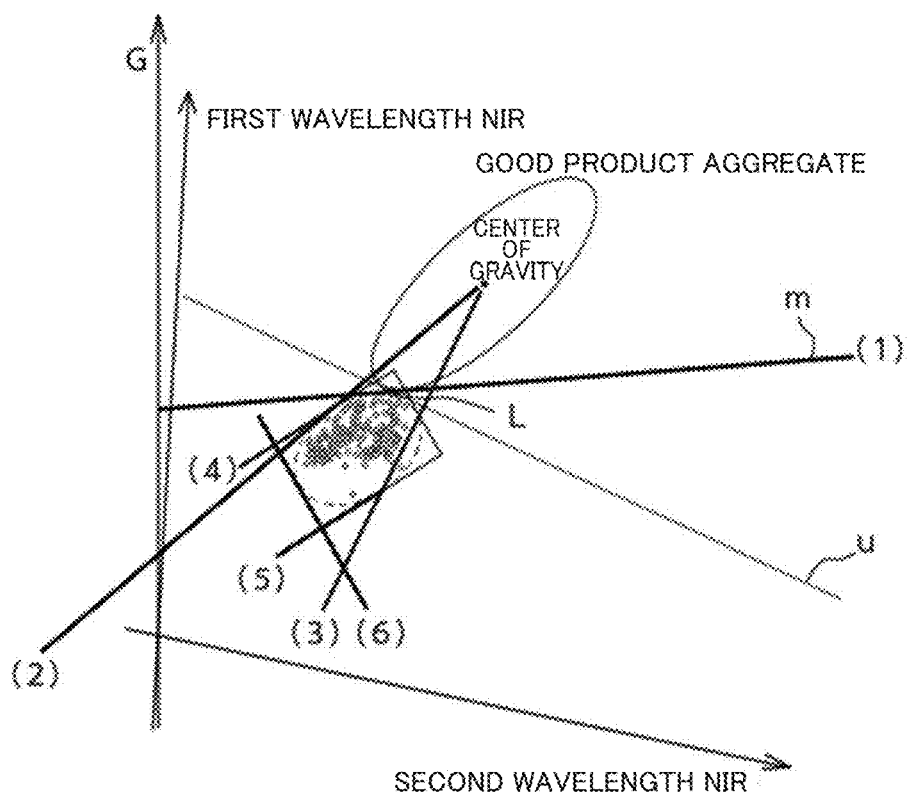
FIG. 27 is a diagram for creating six planes for forming a closed region surrounding an inertia equivalent ellipse in the second embodiment of the present invention.

The above steps create six planes forming a closed region surrounding the inertia equivalent ellipse applied to the defective product aggregate. As shown in FIG. 27, six planes surrounding the inertia equivalent ellipse includes: a first plane, which is the boundary surface (1) that minimizes the Mahalanobis distance; a second plane, which is a plane (2) connecting the center of gravity on the good product aggregate side to one end in the major axis direction of the circumscribed rectangle on the defective product aggregate side; a third plane, which is a plane (3) connecting the center of gravity on the good product aggregate side to the other end in the major axis direction of the circumscribed rectangle on the defective product aggregate side; a fourth plane, which is a long side (4) of the circumscribed rectangle on one side; a fifth plane, which is a long side (5) of the circumscribed rectangle on the other side; and a sixth plane, which is a short side (6) of the circumscribed rectangle on one side far from the good product aggregate.

The six planes (reference numerals (1) to (6) in FIG. 27) forming the closed region are determined by drawing such as creating a circumscribed rectangle. However, the way of determination is not limited to this. To replace the complicated arithmetic processing by the above drawing with a simple array reference processing and improve efficiency, the arithmetic processing can be replaced with a look-up table (LUT) in advance and stored in a memory or the like.

Figure 28:
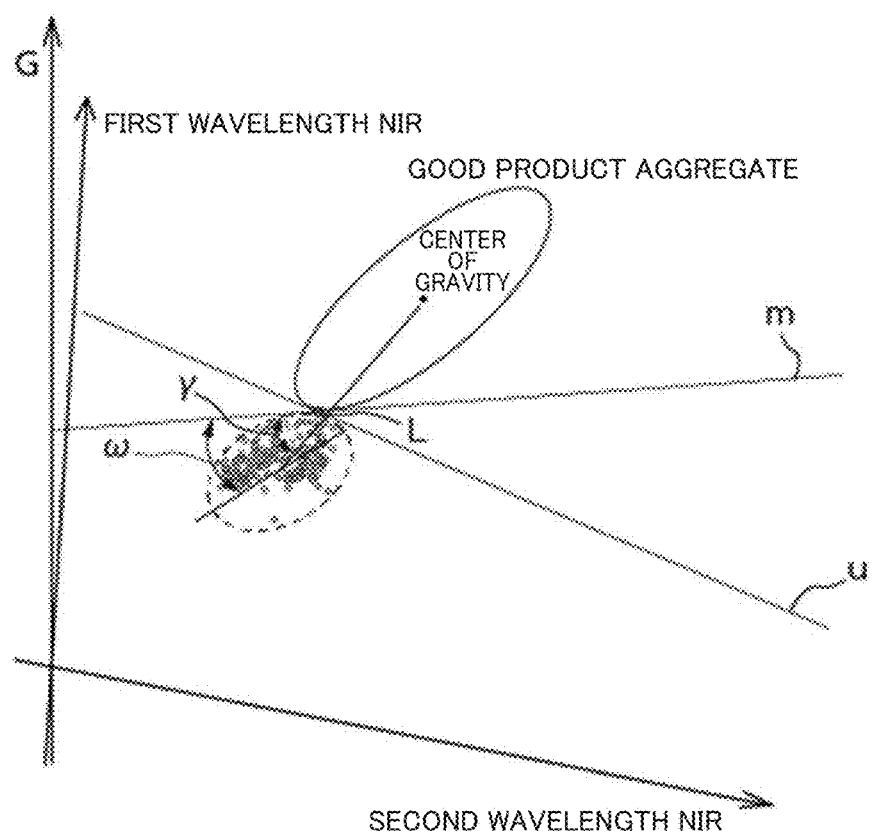
FIG. 28 is a diagram illustrating an exception in drawing a two-dimensional plane in the second embodiment of the present invention.

An exception to the drawing of the plane in the above paragraph 0093 is the case in which the following two angles are both larger than 45°: the angle γ formed by the straight line between the centers of gravity of the aggregates and the boundary surface (1) (see FIG. 28); and the angle ω formed by the major axis and the boundary surface (1) (see FIG. 28). In this case, the fourth plane and the fifth plane are on the side of the short sides, and the sixth plane is on the side of the long side.

Next, step 208 of FIG. 6 adjusts the sensitivity. The sensitivity level has its range represented by a numerical level of 0 to 100. When the sensitivity level is 0, the sensitivity is the minimum sensitivity (MIN) and does not enable discriminating between a good product and a defective product. The level can mix defective products with good products in sorting, and the sensitivity is low. When the sensitivity level is 50, the sensitivity is medium sensitivity (MID), and can accurately discriminate between a good product and a defective product. When the sensitivity level is 100, the sensitivity is maximum sensitivity (MAX), and can discriminate between a good product and a defective product with extremely high accuracy. However, the processing efficiency is poor because the good products are sorted out as well as defective products.

As shown in FIG. 29, the following describes correspondence between: the calculation of the threshold value created by the six planes surrounding the inertia equivalent ellipse described above; and the three sensitivity levels of the minimum sensitivity (MIN), the medium sensitivity (MID), and the maximum sensitivity (MAX).

The minimum sensitivity (MIN) is the same as the sixth plane (6); the medium sensitivity (MID) is the same as the first plane (1); the maximum sensitivity (MAX) is the same as the seventh plane (7), which is formed by a straight line perpendicular to a straight line that bisects the angle formed by the second plane (2) and the third plane (3). In other words, the sensitivity levels are respectively set to the sixth plane (6), the first plane (1), and the seventh plane (7) in FIG. 29. For example, if the sensitivity level is set to the medium sensitivity (MID), the region above the first plane (1) on FIG. 29 is the good product region, and the region below the first plane (1) on FIG. 29 is the defective product region. Then, the illustrated grain A is determined to be a good product, and the grain B is determined to be a defective product by the good/defective discrimination unit 26.

As described above, there is a correspondence between: three threshold values created by the first plane, the sixth plane, and the seventh plane; and three sensitivity levels consisting of the minimum sensitivity (MIN), the medium sensitivity (MID), and the maximum sensitivity (MAX). The correspondence is automatically created by touching the sensitivity creation button (not shown) arranged on the display 11. The threshold values are calculated after reducing the dimension from the three-dimensional space of FIG. 22 to the two-dimensional plane of FIG. 23, so that the signal processing can be greatly simplified.

The threshold value determined by the threshold value calculation unit 28 based on the flow as described above is stored in the threshold value data storage unit 24 of the signal processing unit 20. Subsequently, an actual discrimination work is performed, and the grains to be discriminated are moved from the storage tank 4 to the chute 3 while the ejector nozzle 7 can be driven. When the grains falling from the chute 3 reach the inspection unit 6, the CCD cameras 13a and 13b, and the first wavelength NIR cameras 14-1a and 14-1b and the second wavelength NIR cameras 14-2a and 14-2b image the grains.

The good/defective discrimination unit 26 reads a threshold value in the threshold value data storage unit 24, and discriminates between a good product and a defective product for a grain based on this threshold value, using green (G) wavelength component and two near-infrared light components in the image data captured by the CCD cameras 13a and 13b, and the first wavelength NIR cameras 14-1a and 14-1b and the second wavelength NIR cameras 14-2a and 14-2b. Of course, for a defective product, which clearly differs from a good product in color, a discrimination can be made between the good and the defective using only the wavelength component of green (G).

When the grain determined by the good/defective discrimination unit 26 to be a good product passes through the ejector nozzle 7, the ejector drive circuit 22 does not open the valve of the ejector nozzle 7. Consequently, the grain naturally falls toward the good product collection unit 8. When a grain determined by the good/defective discrimination unit 26 to be a defective product reaches the ejector nozzle 7, the ejector drive circuit 22 opens the valve of the ejector nozzle 7. Consequently, the ejected air from the ejector nozzle 7 blows the grain off the falling trajectory and the grain falls to the defective product collection unit 9.

In the second embodiment, the inspection unit 6 for optical inspection includes a front box 12*a* (first inspection unit) on the front side and a rear box 12*b* (second inspection unit) on the rear side with the falling trajectory a of the grain being therebetween. Each box houses a CCD camera, which is a visible light detection unit, and a first wavelength NIR camera and a second wavelength NIR camera, which are near-infrared light detection units. Therefore, two visible light images, and two first wavelength near-infrared light images and two second wavelength near-infrared light images are acquired for one grain. This configuration enables a grain to be collected by the ejector nozzle 7 to the defective product collection unit 9, for example, if the grain is determined to be a defective product on either the front side or the rear side, enabling a highly accurate discrimination.

[Modification]

The above describes the second embodiment of the optical grain discriminating apparatus of the present invention. However, the present invention is not necessarily limited to the above-described embodiments, and includes, for example, the following modifications.

For example, in the above-mentioned second embodiment, the grains to be discriminated are black sunflower seeds, but other grains may be used. For example, rice grains can be discrimination targets. Specifically, as shown in FIG. 30, it is possible to discriminate between a good product and a defective product, out of the grains to be discriminated, with respect to the threshold value determined based on the optical inspection. The good products include a white rice grain and a shirata, and the defective products include a rice grain with a colored part, rice grain with a lightly baked color, and a foreign substance. For example, as shown in the figure, a "white rice grain", a "shirata", and a "foreign substance" cannot be discriminated from each other in a visible light image. However, a "shirata" can be distinguished from a white rice grain by a near-infrared light image of 850 nm, and "a foreign substance" can be distinguished from a white rice grain by a near-infrared light image of 1550 nm. Then, the optical grain discriminating apparatus 1 creates a three-dimensional optical correlation diagram based on the captured near-infrared light images and the visible light images, and determines the threshold value in the same manner as in the above-described embodiment. Thereby it can accurately discriminate between a good product and a defective product. In the other embodiment shown in the figure, a "shirata" is regarded as a good product, but a "shirata" can be regarded as a defective product according to the setting of the operator, and it is possible to freely select a good product and a defective product in relation to the processing efficiency.

The discrimination target is not limited to the above-mentioned black sunflower seeds and rice grains, and includes grains such as wheat, beans, or nuts, resin pieces such as pellets and beads, fine articles such as drugs, ores, or whitebait, and other grains. The optical grain discriminating apparatus of the present invention can be effectively applied when sorting raw materials including these grains into good products and defective products, or when eliminating foreign substances mixed in raw materials.

In the above-mentioned second embodiment, the discrimination target is a black sunflower seed. In the embodiment, the reflected components of visible light of green (G) and near-infrared light having a wavelength of 850 nm, and the reflected component of near-infrared light having a wavelength of 1550 nm are detected to create a three-dimensional optical correlation diagram. However, it is possible to select the wavelengths of visible light and near-infrared light in which the most significant difference appears, depending on the type of discrimination target. When selecting wavelengths of visible light and near-infrared light, the operator may visually check the three-dimensional optical correlation diagram displayed on the display 11 to select them, or the determination unit 19 may automatically select the wavelength.

More specifically, NIR cameras that capture near-infrared light images of another near-infrared light component of 1200 nm may be added. The NIR cameras include one NIR camera capable of capturing images in a plurality of wavelengths. This allows acquiring near-infrared light images having a plurality of wavelengths according to the type of discrimination target. This further allows: multivariate analysis using the wavelength components of red (R), green (G) and blue (B), and the wavelength components of near-infrared light of 850 nm, 1200 nm and 1550 nm; and creating a three-dimensional optical correlation diagram with the wavelength components having the highest correlation among the wavelength components. This allows setting an appropriate threshold value for various types of objects to be discriminated, and highly accurate discrimination.

In the second embodiment, the visible light detection unit used is a CCD camera capable of detecting three wavelength components of red (R), green (G), and blue (B). However, it is also possible to use a visible light detection unit that can detect only a specific wavelength. Further, in the second embodiment, the first wavelength NIR cameras 14-1*a* and 14-1*b* and the second wavelength NIR cameras 14-2*a* and 14-2*b* are provided according to the wavelength of the near-infrared light. However, the present invention is not limited to this, and the camera to be used may be one NIR camera capable of photographing a plurality of types of wavelength components.

The optical grain discriminating apparatus of the second embodiment is configured to: perform object recognition from the contour of the grain obtained from the visible light image; and adjust the orientation and position of the CCD cameras 13*a* and 13*b*, and the first wavelength NIR cameras 14-1*a* and 14-1*b* and the second wavelength NIR cameras 14-2*a* and 14-2*b* so that the misalignment is prevented in overlaying the near-infrared light image on the contour of the grain. However, the method is not always limited to such a method. For example, when a deviation is observed in the near-infrared light image displayed on the display 11 after object recognition, it is possible to manually or automatically correct the position of the image to correct the deviation.

The second embodiment uses the CCD cameras, which are visible light detection units, and the NIR cameras, which are near-infrared light detection unit, provided in each of the front box 12*a* and the rear box 12*b*, to acquire two visible light images and two near-infrared light images for one grain, and perform a highly accurate discrimination. However, the present invention is not necessarily limited to such a configuration. For example, there may be provided a CCD camera, serving as a visible light detection unit, and a NIR camera, serving as a near-infrared light detection unit, in only one of the front box 12a and the rear box 12b. In yet another modification, the CCD camera and the NIR camera in either one of the front box 12a and the rear box 12b can be provided to serve as a spare in case of failure.

REFERENCE SIGNS LIST 1 optical grain discriminating apparatus
2 machine body
3 chute
4 storage tank
5 vibrating feeder
6 inspection unit
7 ejector nozzle
8 good product collection unit
9 defective product collection unit
10 door
11 display
12a front box
12b rear box
13a, 13b CCD cameras
14a, 14b NIR cameras
14-1a, 14-1b first wavelength NIR cameras
14-2a, 14-2b second wavelength NIR cameras
15a, 15b visible light sources
16a, 16b near-infrared light sources
17a, 17b background
18a, 18b translucent portion
19 determination unit
20 signal processing unit
21 CPU and memory unit
22 ejector drive circuit
23 image data acquisition unit
24 threshold value data storage unit
25 image processing unit
26 good/defective discrimination unit
27 image data storage unit
28 threshold value calculation unit
29 signal transmission/reception unit

The invention claimed is:

1. An optical grain discriminating apparatus comprising:
a plurality of light sources and a plurality of cameras for performing an optical inspection on a grain to be transferred; and
at least one processor for discriminating between a good product and a defective product for the grain, based on the optical inspection by the at least one light source and the at least one camera,
wherein the plurality of light sources includes at least: a visible light source for irradiating the grain with visible light; and a near-infrared light source for irradiating the grain with near-infrared light; and the plurality of cameras includes at least: a visible light camera for detecting visible light transmitted through the grain or visible light reflected from the grain; and a near-infrared light camera for detecting near-infrared light transmitted through the grain or near-infrared light reflected from the grain, and
the at least one processor is configured to:
plot wavelength components of red (R), green (G), and blue (B), and a near-infrared light component in a three-dimensional space, to create a three-dimensional optical correlation diagram, for a plurality of good product samples and a plurality of defective product samples, and thereby sets a threshold value, the wavelength components being detected by the visible light camera, and the near-infrared light component being detected by the near-infrared light camera;
plot two of wavelength components of red (R), green (G), and blue (B) light, and the near-infrared light component in a three-dimensional space, to create a three-dimensional optical correlation diagram, for a plurality of good product samples and a plurality of defective product samples, and thereby sets a threshold value, the wavelength components being detected by the visible light camera, and the near-infrared light component being detected by the near-infrared light camera; and
plot a plurality of combinations of two wavelength components and the near-infrared light component in a three-dimensional space, to create a plurality of types of three-dimensional optical correlation diagrams, for a plurality of good product samples and a plurality of defective product samples, each of the combinations of two wavelength components including any two of wavelength components of the red (R), green (G), and blue (B) light, the wavelength components being detected by the visible light camera, and the near-infrared light component being detected by the near-infrared light camera.

2. The optical grain discriminating apparatus according to claim 1, wherein a near-infrared light component detected by the near-infrared light camera is a near-infrared light component within a contour of the grain detected by the visible light camera.

3. The optical grain discriminating apparatus according to claim 1, wherein the plurality of cameras includes a first plurality of cameras located on a front side of the grain to be transferred, and a second plurality of second cameras located on a rear side of the grain to be transferred, and
the first plurality of cameras and the second plurality of cameras each include the visible light camera and the near-infrared light camera.

4. The optical grain discriminating apparatus according to claim 1, wherein the grain to be transferred is a seed or a kernel.

5. An optical grain discriminating apparatus comprising:
a plurality of light sources and a plurality of cameras for performing an optical inspection on a grain to be transferred; and
at least one processor for discriminating between a good product and a defective product for the grain, based on the optical inspection by the at least one light source and the at least one camera,
wherein the plurality of light sources includes at least: a visible light source for irradiating the grain with visible light; and a near-infrared light source for irradiating the grain with near-infrared light; and the plurality of cameras includes at least: a visible light camera for detecting visible light transmitted through the grain or visible light reflected from the grain; and a near-infrared light camera for detecting near-infrared light transmitted through the grain or near-infrared light reflected from the grain, and
the at least one processor is configured to:
plot wavelength components of red (R), green (G), and blue (B), and a near-infrared light component in a three-dimensional space, to create a three-dimensional optical correlation diagram, for a plurality of good product samples and a plurality of defective product samples, and thereby sets a threshold value, the wavelength components being detected by the visible light camera, and the near-infrared light component being detected by the near-infrared light camera;

plot one of wavelength components of red (R), green (G), and blue (B) light, and a plurality of near-infrared light components in a three-dimensional space, to create a three-dimensional optical correlation diagram, for a plurality of good product samples and a plurality of defective product samples, and thereby sets a threshold value, the wavelength components being detected by the visible light camera, and the near-infrared light components being detected by the near-infrared light camera; and plot one of wavelength components of red (R), green (G), and blue (B) light, and a plurality of combinations of two near-infrared light components in a three-dimensional space, to create a plurality of types of three-dimensional optical correlation diagrams, for a plurality of good product samples and a plurality of defective product samples, the wavelength components being detected by the visible light camera, each of the combinations of two near-infrared light components including any two of the near-infrared light components, and the near-infrared light components being detected by the near-infrared light camera.

6. The optical grain discriminating apparatus according to claim 5, wherein a near-infrared light component detected by the near-infrared light camera is a near-infrared light component within a contour of the grain detected by the visible light camera.

7. The optical grain discriminating apparatus according to claim 5, wherein the plurality of cameras includes a first plurality of cameras located on a front side of the grain to be transferred, and a second plurality of second cameras located on a rear side of the grain to be transferred, and the first plurality of cameras and the second plurality of cameras each include the visible light camera and the near-infrared light camera.

8. The optical grain discriminating apparatus according to claim 5, wherein the grain to be transferred is a seed or a kernel.

* * * * *